US008558828B2

(12) United States Patent
Yamazaki

(10) Patent No.: US 8,558,828 B2
(45) Date of Patent: Oct. 15, 2013

(54) ELECTROOPTIC DEVICE, DRIVING CIRCUIT, AND ELECTRONIC DEVICE

(75) Inventor: Katsunori Yamazaki, Matsumoto (JP)

(73) Assignee: Japan Display West, Inc., Aichi-Ken (JP)

( * ) Notice: Subject to any disclaimer, the term of this patent is extended or adjusted under 35 U.S.C. 154(b) by 1280 days.

(21) Appl. No.: 11/882,831

(22) Filed: Aug. 6, 2007

(65) Prior Publication Data

US 2008/0055294 A1 Mar. 6, 2008

(30) Foreign Application Priority Data

Sep. 1, 2006 (JP) ................................ 2006-237366

(51) Int. Cl.
*G09G 5/00* (2006.01)
*G06F 3/038* (2006.01)
*G09G 3/36* (2006.01)
*G02F 1/133* (2006.01)

(52) U.S. Cl.
USPC ............... 345/214; 345/94; 345/208; 349/33; 349/37

(58) Field of Classification Search
USPC ........... 345/204, 94–96, 208–210; 349/33, 37
See application file for complete search history.

(56) References Cited

U.S. PATENT DOCUMENTS

2002/0084969 A1* 7/2002 Ozawa ............................ 345/96
2006/0119755 A1* 6/2006 Senda et al. .................... 349/38
2007/0070012 A1* 3/2007 Chung ............................ 345/92
2007/0146288 A1* 6/2007 Byun ............................ 345/100

FOREIGN PATENT DOCUMENTS

JP A-2001-083943 3/2001

* cited by examiner

*Primary Examiner* — Sumati Lefkowitz
*Assistant Examiner* — Jonathan Horner
(74) *Attorney, Agent, or Firm* — K&L Gates LLP

(57) ABSTRACT

A driving circuit of an electrooptic device comprises: a plurality of scanning lines; a plurality of data lines; first and second capacitor lines; a common electrode; pixels, the pixels each including: a pixel switching element; a pixel capacitor; and a storage capacitor; a scanning-line driving circuit; and a capacitor-line driving circuit that shifts the voltage of a first (or second) capacitor line corresponding one scanning line to a predetermined voltage when said one scanning line is selected, and when a scanning line apart from said one scanning line by predetermined number of lines is selected, changes the predetermined voltage by a predetermined value or holds the predetermined voltage; and when said one scanning line is selected; and a data-line driving circuit.

8 Claims, 13 Drawing Sheets

<ODD ROW AND ODD COLUMN (EVEN ROW AND EVEN COLUMN)>

<ODD ROW AND EVEN COLUMN (EVEN ROW AND ODD COLUMN)>

FIG. 7A
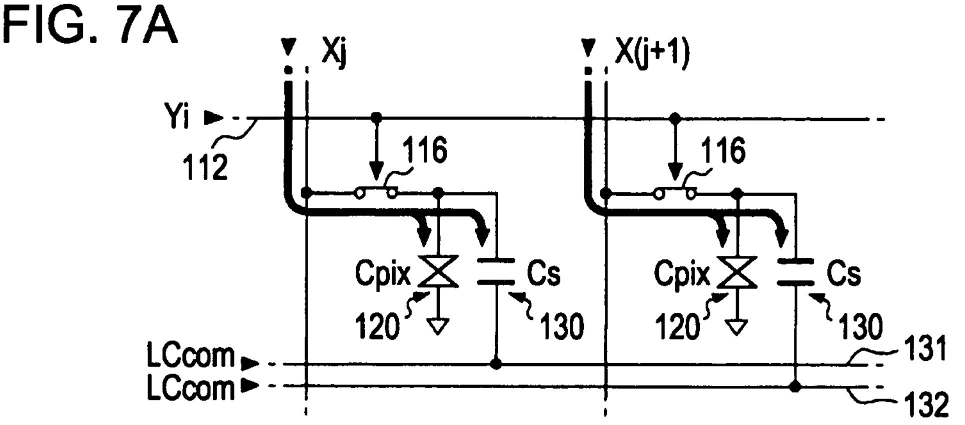
FIG. 7B
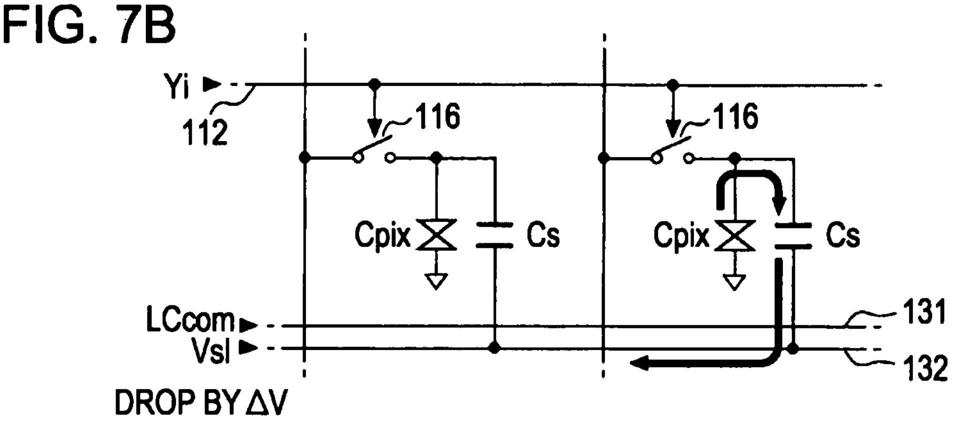
FIG. 8A
FIG. 8B
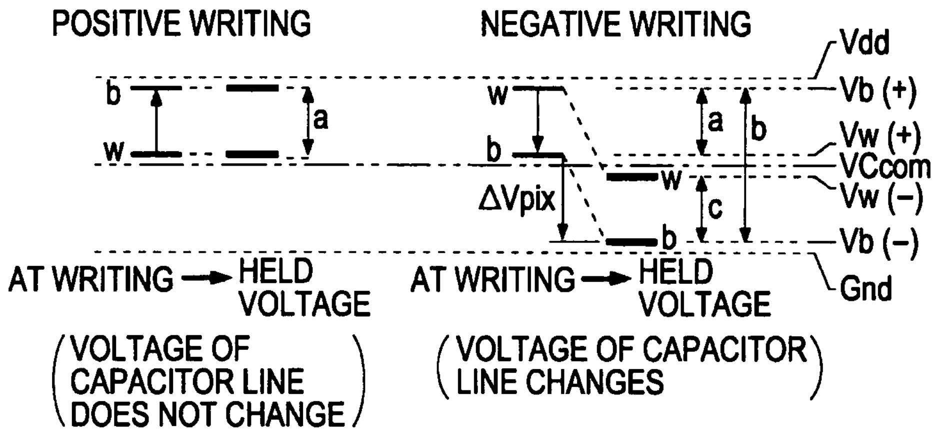

<ODD ROW AND ODD COLUMN (EVEN ROW AND EVEN COLUMN)>

<ODD ROW AND EVEN COLUMN (EVEN ROW AND ODD COLUMN)>

ELECTROOPTIC DEVICE, DRIVING CIRCUIT, AND ELECTRONIC DEVICE

BACKGROUND

1. Technical Field

The present invention relates to a technique for electrooptic devices such as liquid crystal devices to reduce the voltage amplitude of the data lines and to achieve high-definition display.

2. Related Art

Electrooptic devices such as liquid crystal devices have pixel capacitors (liquid-crystal capacitors) corresponding to the intersections of scanning lines and data lines. When there is a need to drive the pixel capacitors by an alternating current, the components of a data-line driving circuit which provides data signals to the data lines are required to have resistance to voltage corresponding to the voltage amplitude of the data signals, because the voltage amplitude has positive and negative polarities. To meet this need, there is proposed a technique for reducing the voltage amplitude of the data signals by providing storage capacitors in parallel to the pixel capacitors and by driving capacitor lines connected to a common storage capacitor in synchronism with the selection of a scanning line in binary (refer to JP-A-2001-83943).

However, since this technique employs a structure in which a capacitor-line driving circuit and a scanning-line driving circuit (substantially, a shift register) share the same lines, the circuit configuration for driving the capacitor lines are complicated.

SUMMARY

An advantage of some aspects of the invention is to provide an electrooptic device, a driving circuit thereof, and an electronic device which can achieve high-definition display while partly reducing the voltage amplitude of the data lines with a simple circuit configuration.

According to a first aspect of the invention, there is provided a driving circuit of an electrooptic device, comprising: a plurality of scanning lines; a plurality of data lines; first and second capacitor lines corresponding to each of the plurality of scanning lines; a common electrode; pixels corresponding to the intersections of the plurality of scanning lines and the plurality of data lines, the pixels each including: a pixel switching element connected at one end to a data line corresponding to the element itself, and brought into conduction when a scanning line corresponding to the element itself is selected; a pixel capacitor disposed between the pixel switching element and the common electrode; and a storage capacitor disposed between one end of the pixel capacitor and one of the first and second capacitor lines corresponding to the scanning line; a scanning-line driving circuit that selects the scanning lines in a predetermined order; and a capacitor-line driving circuit that shifts the voltage of a first capacitor line corresponding one scanning line to a predetermined voltage when said one scanning line is selected, and when a scanning line apart from said one scanning line by predetermined number of lines is selected, changes the predetermined voltage by a predetermined value or holds the predetermined voltage; and when said one scanning line is selected, shifts the voltage of a second capacitor line corresponding said one scanning line to the predetermined voltage, and when a scanning line apart from said one scanning line by predetermined number of lines is selected, holds the predetermined voltage or changes the predetermined voltage by the predetermined value; and a data-line driving circuit that applies a data signal to pixels corresponding to a selected scanning line via a data line, the data signal having a voltage corresponding to the gray level of the pixels. Thus, the voltage amplitude of the data lines can be reduced with a simple configuration, and the voltage to be written to the pixel capacitors can be changed depending on whether the storage capacitor is connected to the first capacitor line or the second capacitor line, thus allowing high-definition display.

Preferably, in the driving circuit of an electrooptic device according to an embodiment of the invention, in the pixels corresponding to the one scanning line, storage capacitors corresponding to data lines in odd-numbered columns are each disposed between one end of a pixel capacitor corresponding to the pixel itself and one of the first and second capacitor lines; and storage capacitors corresponding to data lines in even-numbered columns are each disposed between one end of a pixel capacitor corresponding to the pixel itself and the other one of the first and second capacitor lines. This configuration allows dot reversing in which the written polarity of pixels is reversed alternately every row and column. In this embodiment, the term, odd number and the even number, is merely a relative concept for alternately specifying the successive rows and columns.

Preferably, when the one scanning line is selected, the capacitor-line driving circuit connects the first capacitor line corresponding to the one scanning line to a first feed line that feeds a first capacitance signal of the predetermined voltage, and when a scanning line apart from the one scanning line by predetermined number of lines is selected, the capacitor-line driving circuit connects the first capacitor line to a second feed line that feeds a second capacitance signal of one of voltages higher and lower than the predetermined voltage by a predetermined value or of the predetermined voltage; and when the one scanning line is selected, the capacitor-line driving circuit connects the second capacitor line corresponding to the one scanning line to the first feed line, and when a scanning line apart from the one scanning line by predetermined number of lines is selected, the capacitor-line driving circuit connects the second capacitor line to a third feed line that feeds a third capacitance signal of the predetermined voltage or the other one of voltages higher and lower than the predetermined voltage by the predetermined value.

Preferably, the first capacitance signal is temporally constant at the predetermined voltage; and the voltages of the second and third capacitance signals are higher or lower exclusively from each other, and are switched every time one scanning line is selected.

Preferably, the capacitor-line driving circuit comprises: first to fourth transistors corresponding to each row, wherein the gate electrodes of the first and second transistors corresponding to the first and second capacitor lines, respectively, are connected to the scanning line corresponding to the one scanning line, and the source electrodes of the first and second transistors are connected to the first feed line; the gate electrode of the third transistor is connected to a scanning line apart from the scanning line corresponding to the one capacitor line by predetermined number of lines, and the source electrode of the third transistor is connected to the second feed line; the gate electrode of the fourth transistor is connected to a scanning line apart from the scanning line corresponding to the one capacitor line by predetermined number of lines, and the source electrode of the fourth transistor is connected to the third feed line; and the drain electrodes of the first and third transistors are connected to the first capacitor line corresponding to the line, and the drain electrodes of the second and fourth transistors are connected to the second capacitor line corresponding to the line.

Preferably, the capacitor-line driving circuit brings the first and second capacitor lines corresponding to one scanning line into high impedance after the selection of a scanning line apart from the one scanning line by predetermined number of lines and following the one scanning line is completed until the one scanning line is selected again.

Preferably, the storage capacitors in the odd-numbered rows and the odd-numbered columns and in the even-numbered rows and the even-numbered columns are each disposed between one end of a pixel capacitor corresponding to the storage capacitor itself and one of the first and second capacitor lines; the storage capacitors in the odd-numbered rows and the even-numbered columns and in the even-numbered rows and the odd-numbered columns are each disposed between one end of a pixel capacitor corresponding to the storage capacitor itself and the other one of the first and second capacitor lines; the capacitor-line driving circuit connects a first capacitor line corresponding to one scanning line to a first feed line that feeds a first capacitance signal; and when the one scanning line is selected, connects a second capacitor line corresponding to one scanning line to the first feed line, and when a scanning line apart from the one scanning line by predetermined number of lines is selected, connects the second capacitor line to a second feed line that feeds a second capacitance signal; and the first capacitance signal and the second capacitance signal are switched every period of one or a plurality of frames while holding the difference voltage therebetween at the predetermined value between the case where one is at a high level and the other is at a low level and the case where one is at a low level and the other is at a high level; and the voltage of the common electrode is the same as that of the first capacitance signal.

The invention may be embodied not only as a driving circuit of an electrooptic device but also as an electrooptic device and an electronic device equipped with the electrooptic device.

BRIEF DESCRIPTION OF THE DRAWINGS

The invention will be described with reference to the accompanying drawings, wherein like numbers reference like elements.

FIG. 7A is a diagram illustrating a voltage writing operation and voltage fluctuations of the electrooptic device.

FIG. 7B is a diagram showing a voltage writing operation and voltage fluctuations of the electrooptic device.

FIG. 8A is a diagram showing the relationship between a data signal and a held voltage of the electrooptic device.

FIG. 8B is a diagram showing the relationship between a data signal and a held voltage of the electrooptic device.

DESCRIPTION OF EXEMPLARY EMBODIMENTS

Embodiments of the invention will be described with reference to the drawings.

First Embodiment

Figure 1:
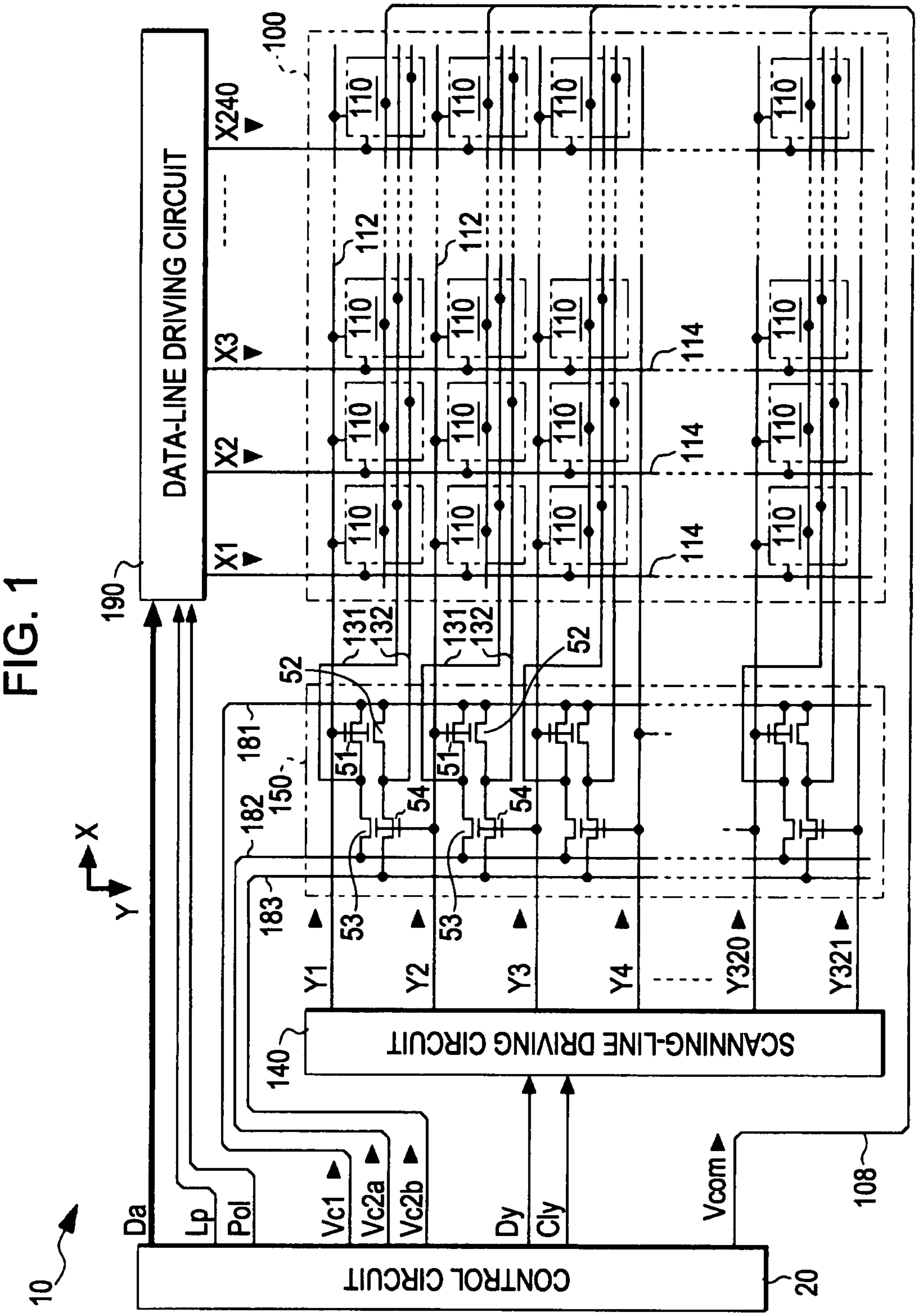
FIG. 1 is a block diagram showing the configuration of an electrooptic device according to a first embodiment of the invention.

A first embodiment of the invention will first be described. FIG. 1 is a block diagram of an electrooptic device according to a first embodiment of the invention.

As shown in the diagram, the electrooptic device, denoted at 10, has a display region 100, and a control circuit 20, a scanning-line driving circuit 140, a capacitor-line driving circuit 150, and a data-line driving circuit 190 around the display region 100. The display region 100 has an array of pixels 110, in which 321 scanning lines 112 extend transversely (in the X direction) and 240 data lines extend longitudinally (in the Y direction). The pixels 110 are disposed at the intersections of the first to $320^{th}$ scanning lines 112 and the first to $240^{th}$ data lines 114.

Accordingly, in this embodiment, the pixels 110 are arrayed in a 320 by 240 matrix in the display region 100. The invention is not however limited to that matrix.

In this embodiment, the $321^{st}$ scanning line 112 does not contribute to the vertical scanning of the display region 100 (sequential selection of scanning lines for writing voltage to the pixels 110). In this embodiment, a pair of first and second capacitor lines 131 and 132 extends in the X direction such that it corresponds to the first to $320^{th}$ scanning lines 112.

The pixels 110 of odd-numbered (first to $239^{th}$) columns correspond to the first capacitor line 131, while the pixels 110 of even-numbered (second to $240^{th}$) columns correspond to the second capacitor line 132. The detailed structure of the pixels 110 will now be described.

Figure 2:
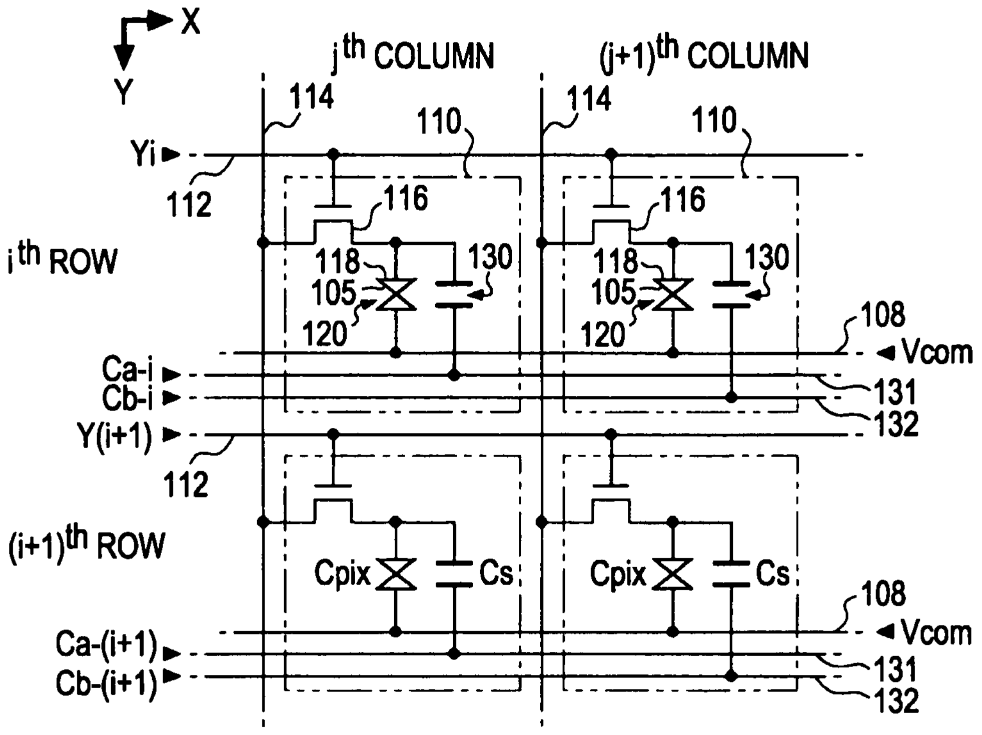
FIG. 2 is a diagram showing the configuration of pixels of the electrooptic device.

FIG. 2 shows the structure of the pixels 110, in which 2×2=4 pixels corresponding to the intersections of the $i^{th}$ row and the adjacent $(i+1)^{th}$ row and the $j^{th}$ column and the adjacent $(i+1)^{th}$ column are shown.

In this embodiment, symbols i and (i+1) denote any continuous two rows of pixels 110, which range from 1 to 320. Here, symbols i and (i+1) of the rows corresponding to the scanning lines 112 are integers from 1 to 321 because the dummy $321^{st}$ line must be included.

On the other hand, symbol j denotes any odd-numbered column of the pixels 110, which ranges from 1 to 239. Therefore, (j+1) is an even number ranging from 2 to 240 which is larger than the odd number j by one.

As shown in FIG. 2, each pixel 110 includes an n-channel thin film transistor (hereinafter, simply referred to as a TFT)

116 serving as a pixel switching element, a pixel capacitor (liquid-crystal capacitor) 120, and a storage capacitor 130. Since the pixels 110 have the same structure except the line to which the storage capacitor 130 is connected, the pixel 110 in the $i^{th}$ row and the $j^{th}$ column will be described as a typical example. In the pixel 110 of the $i^{th}$ row and the $j^{th}$ column, the gate electrode of the TFT 116 is connected to the $i^{th}$ scanning line 112, the source electrode is connected to the data line 114 on the $j^{th}$ column, and the drain electrode is connected to a pixel electrode 118 which is a first end of the pixel capacitor 120.

A second end of the pixel capacitor 120 is a common electrode 108. The common electrode 108 is common to all the pixels 110, to which a common signal Vcom is provided, as shown in FIG. 1. The common signal Vcom of this embodiment is a temporally constant voltage LCcom, as will be described later.

The storage capacitor 130 of the pixel 110 in the $i^{th}$ row and the odd-numbered $j^{th}$ column is connected to the pixel electrode 118 (the drain electrode of the TFT 116) at one end and connected to the first capacitor line 131 in the $i^{th}$ row at the other end. The storage capacitor 130 of the pixel 110 in the $i^{th}$ row and the even-numbered $(j+1)^{th}$ column is connected to the pixel electrode 118 at one end, as that of the odd-numbered column, but is connected to the second capacitor line 132 of the $i^{th}$ row at the other end. The capacitances of the storage capacitors 130 of the odd-numbered column and the even-numbered column are equal, which are expressed as Cs. The capacitance of the pixel capacitor 120 is expressed as Cpix.

In FIG. 2, symbols Yi and Y(i+1) indicate scanning signals provided to the $i^{th}$ and $(i+1)^{th}$ scanning lines 112, respectively, and symbols Ca-i and Cb-i indicate voltages of the first capacitor line 131 and the second capacitor line 132 corresponding to the $i^{th}$ row, respectively.

The display region 100 has a structure in which a pair of substrates, a device substrate having the pixel electrodes 118 and an opposing substrate having the common electrodes 108, are bonded together such that the electrode formed surfaces face with a space therebetween, in which liquid crystal 105 is sealed. Thus, the pixel capacitor 120 sandwiches the liquid crystal 105 which is a kind of dielectric with the pixel electrode 118 and the common electrode 108 and holds the difference voltage between the pixel electrode 118 and the common electrode 108. With this structure, the amount of light transmission of the pixel capacitor 120 changes with the effective value of the held voltage. It is assumed that this embodiment is in a normally white mode in which if the effective voltage held by the pixel capacitor 120 is close to zero, the light transmittance becomes the maximum to provide white display, and the amount of transmission decreases as the effective voltage increases, and it finally becomes the minimum to display in black.

Returning back to FIG. 1, the control circuit 20 outputs various control signals to control the components of the electrooptic device 10, and provides a first capacitance signal Vc1 to a first feed line 181, a second capacitance signal Vc2*a* to a second feed line 182, and a third capacitance signal Vc2*b* to a third feed line 183, respectively. The control circuit 20 provides the common signal Vcom to the common electrode 108.

Around the display region 100 are provided peripheral circuits such as the scanning-line driving circuit 140, the capacitor-line driving circuit 150, and the data-line driving circuit 190. Among them, the scanning-line driving circuit 140 provides scanning signals Y1 to Y321 to the first to $321^{st}$ scanning lines 112, respectively, for the period of one frame. Specifically, the scanning-line driving circuit 140 selects the scanning lines in the order from the first to $321^{st}$ row, and provides a scanning signal of a high level corresponding to selected voltage Vdd to a selected scanning line, and a scanning signal of a low level corresponding to unselected voltage (ground potential Gnd) to the other scanning lines.

Figure 4:
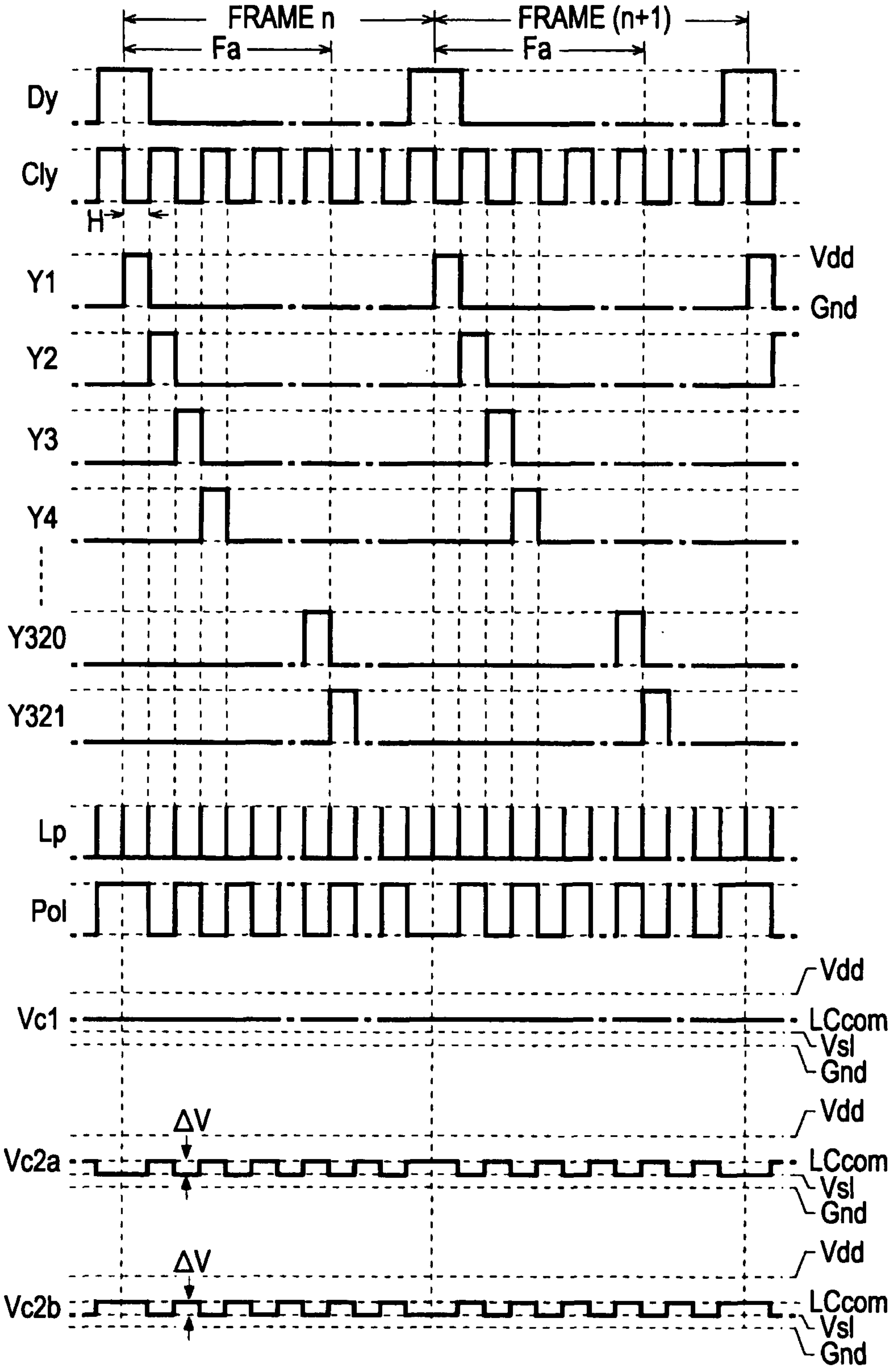
FIG. 4 is a diagram for illustrating the operation of the electrooptic device.

More specifically, as shown in FIG. 4, the scanning-line driving circuit 140 outputs the scanning signals Y1 to Y321 by shifting a start pulse Dy applied from the control circuit 20 according to a clock signal Cly.

As shown in FIG. 4, the period of one frame in this embodiment includes an effective scanning period Fa after the scanning signal Y1 has reached a high level until the scanning signal Y320 reaches a low level and the other period, that is, the flyback time after the dummy scanning signal Y321 has reached a high level until the scanning signal Y1 goes to a high level again. The period during which one scanning line 112 is selected is a horizontal scanning period H.

The capacitor-line driving circuit 150 of this embodiment includes a set of TFTs 51 to 54 provided for each row. The TFTs 51 to 54 corresponding to the $i^{th}$ row will be described herein. The gate electrode of the TFT 51 (a first transistor) and the gate electrode of the TFT 52 (a second transistor) are connected to the $SEi^{th}$ scanning line 112 in common, and their source electrodes are connected to the first feed line 181 in common. The gate electrode of the TFT 53 (a third transistor) and the gate electrode of the TFT 54 (a fourth transistor) corresponding to the $i^{th}$ row are connected, in common, to the $(i+1)^{th}$ scanning line 112 that is selected next to the $i^{th}$ row, while the source electrode of the TFT 53 is connected to the second feed line 182, and the source electrode of the TFT 54 is connected to the third feed line 183. The common drain electrode of the TFTs 51 and 53 corresponding to the $i^{th}$ row is connected to the first capacitor line 131 of the $i^{th}$ row, and the common drain electrode of the TFTs 52 and 54 corresponding to the $i^{th}$ row is connected to the second capacitor line 132 of the $i^{th}$ row. While we have described the TFTs 51 to 54 of the $i^{th}$ row as a representative example, those of the other rows have the same structure.

The data-line driving circuit 190 provides data signals X1 to X240 of the voltage corresponding to the gray level of the pixels 110 on the scanning line 112 selected by the scanning-line driving circuit 140 and responsive to a polarity indication signal Pol to the first to $240^{th}$ data lines 114, respectively.

The data-line driving circuit 190 has storage regions (not shown) corresponding to the 320- by 240-pixel matrix array, in each of which display data Da that indicates the gray level (luminosity) of a corresponding pixel 110 is stored. When the display content is changed, the display data Da stored in each storage region is updated to new display data Da given along with its address by the control circuit 20.

The data-line driving circuit 190 executes the operation of reading the display data Da of the pixels 110 on the selected scanning line 112 from the storage region, converting it to a data signal of a voltage corresponding to the gray level and the designated polarity, and supplying it to the data line 114, for each of the first to $240^{th}$ columns of the selected scanning line 112.

The polarity indication signal Pol of this embodiment indicates, for a high level, positive writing to the pixels in the odd-numbered rows and odd-numbered columns (and in the even-numbered rows and even-numbered columns), and indicates negative writing to the pixels in the odd-numbered rows and even-numbered columns (and in the even-numbered rows and odd-numbered columns); in contrast, for a low level, the polarity indication signal Pol indicates negative writing to the pixels in the odd-numbered rows and odd-numbered columns (and in the even-numbered rows and even-numbered columns), and positive writing to the pixels in the odd-numbered rows and even-numbered columns (and in the even-numbered rows and odd-numbered columns), thus reversing the polarity every horizontal scanning period H of one frame, as shown in FIG. 4. That is, this embodiment adopts dot reversing in which the written polarity is reversed every row and column.

The polarity indication signal Pol of adjacent frames is reversed in logic during a horizontal scanning period during which the same scanning line is selected, that is, it shifts in phase by 180 degrees during the period of the adjacent frames. The reason for reversing the polarity is to prevent the degradation of the liquid crystal due to application of a direct current component.

In this embodiment, if the voltage written to the pixel capacitor 120 corresponding to the gray level is higher than that of the common electrode 108, the polarity of the voltage is referred to as positive polarity, and if the voltage is lower, its polarity is referred to as negative polarity. The voltage is based on the ground potential Gnd of the power source, except as otherwise noted.

The control circuit 20 provides a latch pulse Lp to the data-line driving circuit 190 at the timing at which the logic level of the clock signal Cly shifts. Since the scanning-line driving circuit 140 outputs the scanning signals Y1 to Y321 by shifting the start pulse Dy in response to the clock signal Cly or the like, as described above, the timing to start the period during which a scanning line is selected is the timing at which the logic level of the clock signal Cly shifts. Thus, the data-line driving circuit 190 can be notified of a scanning line selected by continuously counting the latch pulse Lp for the period of one frame and of the scanning-line selection start timing by the timing at which the latch pulse Lp is provided.

In this embodiment, the device substrate has, in addition to the scanning lines 112, the data lines 114, the first capacitor lines 131, the second capacitor lines 132, the TFTs 116, the pixel electrodes 118, and the storage capacitors 130 in the display region 100, the TFTs 51 to 54, the first feed line 181, the second feed line 182, and the third feed line 183 of the capacitor-line driving circuit 150.

Figure 3:
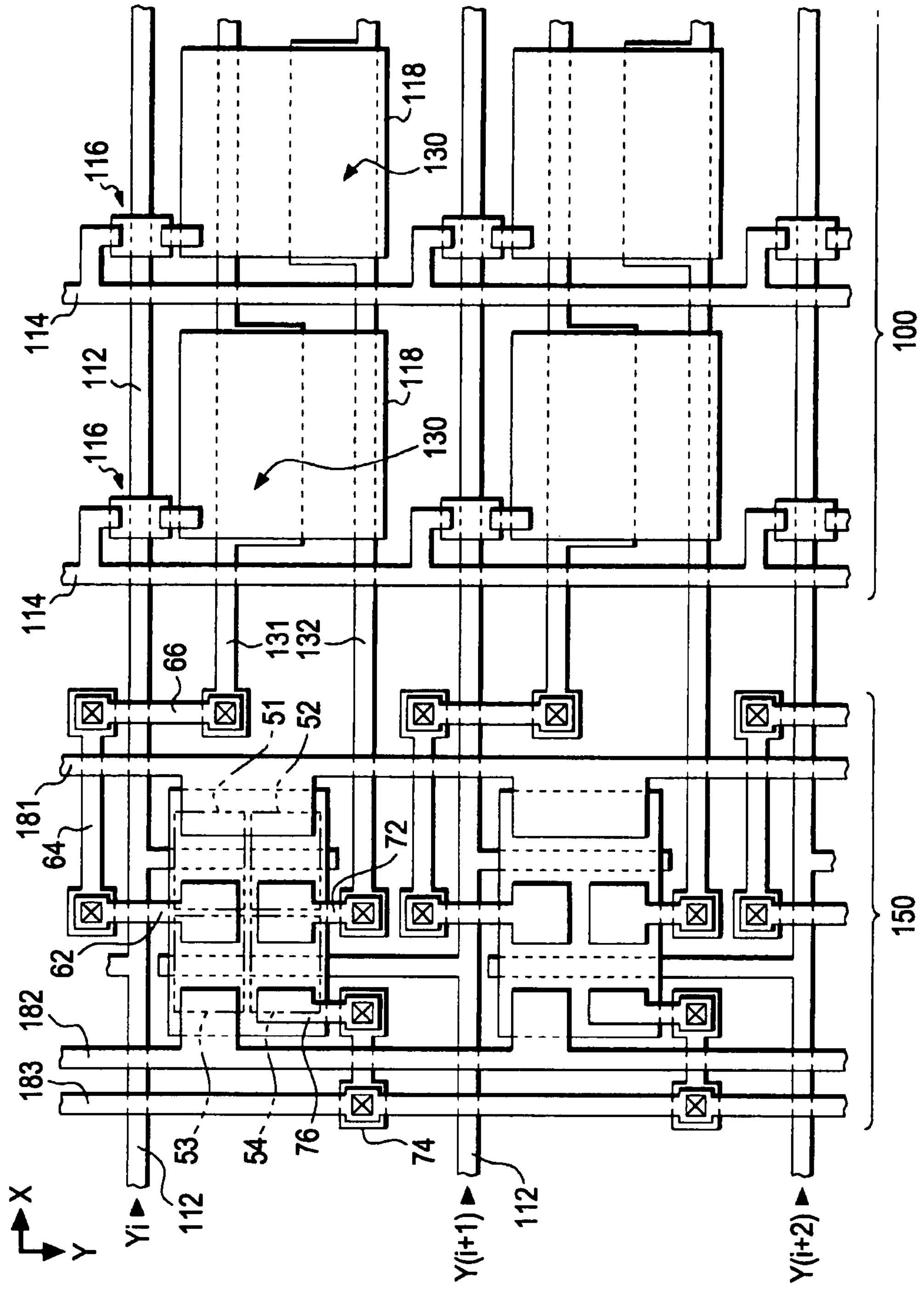
FIG. 3 is a diagram showing the configuration of the boundary between the display region and the capacitor-line driving circuit of the electrooptic device.

FIG. 3 is a plan view of the configuration around the boundary between the capacitor-line driving circuit 150 and the display region 100.

As shown in this drawing, the TFTs 116 and 51 to 54 are of an amorphous silicon type and of a bottom gate type in which their gate electrodes are located lower than the semiconductor layer (on the back of the drawing).

More specifically, a gate electrode layer serving as a first conductive layer is patterned into the scanning lines 112, the first capacitor lines 131, the second capacitor lines 132, and the gate electrodes of the TFTs, on which a gate insulator film (not shown) is formed, and the semiconductor layer of the TFTs is formed like islands. The semiconductor layer has thereon the rectangular pixel electrodes 118 formed by patterning an indium tin oxide (ITO) layer serving as a second conductive layer, with a protective layer therebetween. The semiconductor layer further has various connecting lines including the source electrodes and the drain electrodes of the TFTs, the data lines 114, the first feed lines 181, the second feed lines 182, and the third feed lines 183 which are formed by patterning a metal layer made of aluminum or the like serving as a third conductive layer.

The scanning lines 112 extend in the X direction in the display region 100, as described above.

The $i^{th}$ scanning line 112 has in the capacitor-line driving circuit 150 a branch extending in the Y direction (downward) so as to form the gate electrode of the TFTs 51 and 52, and an upward branch so as to form the gate electrode of the TFTs 53 and 54 corresponding to the $(i-1)^{th}$ row one row above, with the other portion extending in the X direction as in the display region 100.

The common drain electrode 62 of the TFTs 51 and 53 is formed by patterning the third conductive layer, and is connected to a line 64 formed by patterning the gate electrode layer through a contact hole (indicated by x in the drawing) in the protective layer and the gate insulating layer. The line 64 is connected to a line 66 formed by patterning the third conductive layer through a contact hole. The line 66 is connected to the first capacitor line 131 of the $i^{th}$ row through a contact hole.

The common drain electrode 72 of the TFT 52, and 54 is formed by patterning the third conductive layer, and is connected to the second capacitor line 132 of the $i^{th}$ row through a contact hole.

The third feed line 183 is connected to a line 74 formed by patterning the gate electrode layer through a contact hole. The line 74 is connected to the source electrode 76 of the TFT 54 through a contact hole. The source electrode 76 is formed by patterning the third conductive layer.

The portion (wide portion) of the first feed line 181 overlapping with the semiconductor layer of the TFTs serves as the source electrode of the TFTs 51 and 52, and the portion of the second feed line 182 overlapping with the semiconductor layer serves as the source electrode of the TFT 53.

The storage capacitors 130 corresponding to the pixels on the odd-numbered columns each have the gate insulating layer serving as a dielectric under the pixel electrode 118, the gate insulating layer being sandwiched between the wide portion of the first capacitor line 131 and the pixel electrode 118. The storage capacitors 130 in the even-numbered columns each have the gate insulating layer serving as a dielectric under the pixel electrode 118, the gate insulating layer being sandwiched between the wide portion of the second capacitor line 132 and the pixel electrode 118.

The common electrodes 108 are not shown in FIG. 3 which is a plan view of the device substrate, because they are disposed on an opposing substrate.

FIG. 3 merely shows an example and the TFTs may have another structure; for example, the gate electrodes may be of a top gate type, or the TFTs may be of a polysilicon type in term of process. The elements of the capacitor-line driving circuit 150 may not be disposed in the display region 100 but IC chips may be mounted on the device substrate.

If IC chips are mounted on the device substrate, the scanning-line driving circuit 140 and the capacitor-line driving circuit 150 may be mounted as one semiconductor chip together with the data-line driving circuit 190, or alternatively, they may be separate chips. The control circuit 20 may either be disposed on a separate flexible printed circuit (FPC) board or the like or mounted on the device substrate as a semiconductor chip.

If this embodiment is not of a transmissive type but of a reflective type, the pixel electrode 118 may be a reflective conductor pattern or a separate reflective metal pattern. As a further alternative, a semitransmissive and semireflective type that is a combination of the transmissive type and the reflective type is possible.

The operation of the electrooptic device 10 according to this embodiment will be described.

The control circuit 20 reveres the polarity of the polarity indication signal Pol every horizontal scanning period H, as described above. Thus, the polarity indication signal Pol goes to a high level at the start of the period of one frame (denoted at frame n), and reverses the polarity every horizontal scanning period H, and goes to a low level at the start of the following (n+1) frame period, and thereafter reverses the polarity every horizontal scanning period H.

In this embodiment, the control circuit 20 controls the first capacitance signal Vc1 to the same and constant voltage LCcom as that of the common electrode 108. For the second capacitance signal Vc2*a*, the control circuit 20 controls it to a voltage Vs1 lower than voltage LCcom by a voltage ΔV to bring the polarity indication signal Pol to a high level, and to voltage LCcom to bring the polarity indication signal Pol to a low level. The control circuit 20 controls the third capacitance signal Vc2*b* to voltage LCcom to bring the polarity indication signal Pol to a high level, and to voltage Vs1 to bring the polarity indication signal Pol to a low level.

That is, the second capacitance signal Vc2*a* and the third capacitance signal Vc2*b* are switched between the voltages LCcom and Vs1 exclusively in accordance with the level of the polarity indication signal Pol every horizontal scanning period H.

For frame n, since the first scanning line 112 is first selected by the scanning-line driving circuit 140, the scanning signal Y1 goes to a high level.

When a latch pulse Lp is output at the timing that the scanning signal Y1 goes to a high level, the data-line driving circuit 190 reads the display data Da of the pixels in the first row and the first to 240$^{th}$ columns, and since the polarity indication signal Pol is at a high level, the data-line driving circuit 190 converts the voltage of the odd-numbered columns to a voltage higher than voltage LCcom by the voltage designated by the display data Da of the read columns, and converts the voltage of the even-numbered columns to a voltage corresponding to the display data Da of the read columns and negative polarity (its meaning will be described later).

The data-line driving circuit 190 provides the voltage converted for each column to the data lines 114 of the first to 240 columns as data signals X1 to X240.

When the scanning signal Y1 goes to a high level, the TFTs 116 of the pixels from the first row and the first column to the first row and the 240$^{th}$ column are turned on, so that the data signals X1 to X240 are applied to the pixel electrodes 118. Therefore, the difference voltage between the data signals X1 to X240 and voltage LCcom is written to the pixel capacitors 120 from the first row and the first column to the first row and the 240$^{th}$ column.

When the scanning signal Y1 goes to a high level, the TFTs 51 and 52 in the first row are turned on (the TFT 53 and 54 are turned off) in the capacitor-line driving circuit 150. Thus, the first capacitor line 131 and the second capacitor line 132 corresponding to the first row are connected to the first feed line 181 to which the first capacitance signal Vc1 of voltage LCcom is provided.

Accordingly, the first capacitor line 131 and the second capacitor line 132 corresponding to the first row also have voltage LCcom. Thus, the difference voltage between the data signals X1 to X240 and voltage LCcom is written to the storage capacitors 130 from the first row and the first column to the first row and the 240$^{th}$ column in a manner similar to the pixel capacitors 120.

Then, the scanning signal Y1 goes to a low level, and the scanning signal Y2 goes to a high level.

In the capacitor-line driving circuit 150, as the scanning signal Y1 goes to a low level, the TFTs 51 and 52 in the first row are turned off, and as the scanning signal Y2 goes to a high level, the TFTs 53 and 54 in the first row are turned on. Thus, the first capacitor line 131 corresponding to the first row is connected to the second feed line 182 to which the second capacitance signal Vc2*a* is provided, and the second capacitor line 132 corresponding to the first row is connected to the third feed line 183 to which the third capacitance signal Vc2*b* is provided.

When the scanning signal Y2 goes to a high level in frame n, the polarity indication signal Pol is inverted to a low level, so that the second capacitance signal Vc2*a* becomes voltage LCcom and the third capacitance signal Vc2*b* becomes voltage Vs1. Thus, the first capacitor line 131 corresponding to the first row is kept at voltage LCcom, but the voltage of the second capacitor line 132 corresponding to the first row shifts to voltage Vs1, dropping by a voltage ΔV.

Accordingly, when the scanning signal Y2 goes to a high level in frame n, the pixels in the first row and the odd-numbered columns hold the difference voltages that are written to the pixel capacitor 120 and the storage capacitor 130 when the scanning signal Y1 goes to a high level; for the pixels on the odd-numbered columns, with the pixel capacitor 120 and the storage capacitor 130 connected in series, the second capacitor line 132 which is the second end of the storage capacitor 130 drops by voltage ΔV while the common electrode 108 which is the second end of the pixel capacitor 120 is held constant at voltage LCcom. Thus, the difference voltages that was written to the pixel capacitor 120 and the storage capacitor 130 change when the scanning signal Y1 went to a high level. The change in the voltages will be described later.

When the latch pulse Lp is output at the timing that the scanning signal Y2 goes to a high level, the data-line driving circuit 190 reads the display data Da of the pixels in the second row and the first to 240$^{th}$ columns, and since the polarity indication signal Pol is reversed to a low level, the data-line driving circuit 190 converts the voltage for the odd-numbered columns to a voltage corresponding to the display data Da of the read columns and corresponding to negative polarity, and converts the voltage for the even-numbered columns to a voltage higher than voltage LCcom by the voltage corresponding to the display data Da of the read columns, and applies the voltages converted for the columns to the data lines 114 on the first to 240$^{th}$ columns as data signals X1 to X240.

When the scanning signal Y2 is at a high level, the TFTs 116 of the pixels from the second row and the first column to the second row and the 240$^{th}$ column are turned on. Thus, the difference voltage between the data signals 1 to X240 and voltage LCcom is written to the pixel capacitors 120 from the second row and the first column to the second row and the 240$^{th}$ column.

In addition, for the capacitor-line driving circuit 150, when the scanning signal Y2 is at a high level, the TFTs 51 and 52 in the second row are turned on. Thus, the first capacitor line 131 and the second capacitor line 132 corresponding to the second row are connected to the first feed line 181 to carry voltage LCcom.

Accordingly, the difference voltage between the data signals X1 to X240 and voltage LCcom is written to the storage capacitors 130 from the second row and the first column to the second row and the 240$^{th}$ column in a manner similar to the pixel capacitor 120.

Then, the scanning signal Y2 goes to a low level, and the scanning signal Y3 goes to a high level.

In the capacitor-line driving circuit 150, since the scanning signal Y2 goes to a low level, the TFTs 53 in the first row are turned off. Therefore, the first capacitor line 131 corresponding to the first row is disconnected from any part into high impedance but is held by its parasitic capacitance at voltage LCcom just before the TFTs 53 are turned off.

Similarly, since the scanning signal Y2 goes to a low level, the TFT 54 in the first row is turned off. Therefore, the second capacitor line 132 corresponding to the first row goes into high impedance but is held by its parasitic capacitance at voltage Vs1 just before the TFT 54 is turned off.

Accordingly, the pixel capacitors 120 in the first row and the odd-numbered columns hold the difference voltage between the voltage of the data signal written when the scanning signal Y1 is at a high level and the voltage LCcom of the common electrode 108, while the pixel capacitors 120 in the first row and the even-numbered columns hold the voltage changed when the scanning signal Y2 goes to a high level.

The second row of the capacitor-line driving circuit 150 will be described. Since the scanning signal Y2 goes to a low level, the TFTs 51 and 52 in the second row are turned off, and since the scanning signal Y3 goes to a high level, the TFTs 53 and 54 in the second row are turned on.

When the scanning signal Y3 in frame n goes to a high level, the polarity indication signal Pol is reversed again to a high level, so that the second capacitance signal Vc2*a* becomes voltage Vs1 and the third capacitance signal Vc2*b* becomes voltage Lcom, and therefore, the voltage of the first capacitor line 131 corresponding to the second row becomes voltage Vs1, dropping by ΔV, and the second capacitor line 132 corresponding to the second row is held at voltage LCcom, with no change in voltage.

Accordingly, when the scanning signal Y3 goes to a high level in frame n, in the pixels of the second row and the odd-numbered columns, with the pixel capacitor 120 and the storage capacitor 130 connected in series, the second capacitor line 132 which is the second end of the storage capacitor 130 drops by ΔV, while the common electrode 108 which is the second end of the pixel capacitor 120 is held constant at voltage LCcom. Therefore, the difference voltage that was written to the pixel capacitor 120 and the storage capacitor 130 when the scanning signal Y2 went to a high level changes. On the other hand, in the pixels of the odd-numbered columns, the difference voltage written to the pixel capacitor 120 and the storage capacitor 130 when the scanning signal Y2 went to a high level is held.

When the scanning signal Y3 goes to a high level, the voltage writing operation similar to that when the scanning signal Y1 was at a high level is executed for the pixels from the third row and the first column to the third row and the 240$^{th}$ column.

Then, the scanning signal Y3 goes to a low level, and the scanning signal Y4 goes to a high level.

In the capacitor-line driving circuit 150, since the scanning signal Y3 goes to a low level, the TFT 53 in the second row is turned off, and therefore, the first capacitor line 131 corresponding to the second row goes into high impedance but is held at voltage Vs1 which is the voltage directly before the TFT 53 is turned off by its parasitic capacitance. Similarly, since the scanning signal Y3 goes to a low level, the TFT 54 in the second row is turned off, and thus, the second capacitor line 132 corresponding to the second row goes into high impedance but is held at voltage LCcom which is the voltage directly before the TFT 54 is turned off.

Accordingly, the pixel capacitors 120 in the second row and the odd-numbered columns are held at the voltage changed when the scanning signal Y2 went to a high level, while the pixel capacitors 120 in the second row and the even-numbered columns are held at the difference voltage between the voltage of the data signal written when the scanning signal Y2 was at a high level and the voltage LCcom of the common electrode 108.

When the scanning signal Y4 goes to a high level, the voltage writing operation similar to that when the scanning signal Y2 was at a high level is executed for the pixels from the fourth row and the first column to the fourth row and the 240$^{th}$ column.

The same operation is repeated in frame n.

Specifically, when a scanning line in an odd-numbered row is selected in frame n and the scanning signal to the scanning line goes to a high level, in the pixels of the preceding even-numbered row and the odd-numbered columns, the difference voltage written to the pixel capacitor 120 and the storage capacitor 130 changes; for the pixels in the even-numbered rows and the even-numbered columns, the difference voltage written to the pixel capacitor 120 and the storage capacitor 130 is held; for the pixels in the odd-numbered rows and the odd-numbered columns, the difference voltage between the voltage higher than voltage LCcom by the voltage designated by the read display data Da and voltage LCcom is written to the pixel capacitor 120 and the storage capacitor 130; and for the pixels in the odd-numbered rows and the even-numbered columns, the difference voltage between the voltage corresponding to the read display data Da and to the negative polarity and voltage LCcom is written to the pixel capacitor 120 and the storage capacitor 130.

When a scanning line in an even-numbered row is selected in frame n and the scanning signal to the scanning line goes to a high level, for the pixels in the preceding odd-numbered row and the odd-numbered columns, the difference voltage written to the pixel capacitor 120 and the storage capacitor 130 is held, and for the pixels in the odd-numbered rows and the even-numbered columns, the difference voltage written to the pixel capacitor 120 and the storage capacitor 130 changes and; for the pixels in the even-numbered rows and the odd-numbered columns, the difference voltage between the voltage corresponding to the read display data Da and to the negative polarity and voltage LCcom is written to the pixel capacitor 120 and the storage capacitor 130, and for the pixels in the even-numbered rows and the even-numbered columns, the difference voltage between the voltage higher than voltage LCcom by the voltage designated by the read display data Da and voltage LCcom is written to the pixel capacitor 120 and the storage capacitor 130.

Since no pixel is present in the 321$^{st}$ scanning line 112, when the scanning signal Y321 goes to a high level, only the operation of turning on the TFTs 53 and 54 corresponding to the immediately preceding 320$^{th}$ row to connect the first capacitor line 131 in the 320$^{th}$ row to the second feed line 182 and connect the second capacitor line 132 to the third feed line, respectively, is executed.

In the following frame (n+1), the phase of the polarity indication signal Pol shifts by 180 degrees. Therefore, the operation of the pixels in the odd-numbered rows and odd-numbered columns (and the even-numbered rows and the even-numbered columns) in frame (n+1) are the same as that of the pixels in the odd-numbered rows and the even-numbered columns (and the even-numbered rows and the odd-numbered columns) in frame n, and the operation of the pixels in the odd-numbered rows and the even-numbered columns (and the even-numbered rows and the odd-numbered columns) in frame (n+1) are the same as that of the pixels in the odd-numbered rows and the odd-numbered columns (and the even-numbered rows and the even-numbered columns) in frame n.

The changes in the voltages of the pixel capacitors 120 between in the odd-numbered rows and the even-numbered columns (and the even-numbered rows and the odd-numbered columns) in frame n and in the odd-numbered rows and the odd-numbered columns (and the even-numbered rows and the even-numbered columns) will be described.

FIGS. 7A and 7B show the operation of holding the voltage of the pixel capacitors 120 of the pixels in the odd $i^{th}$ row and the odd $j^{th}$ column and the adjacent pixels in the odd $i^{th}$ row and the even $(j+1)^{th}$ column.

When a scanning signal Yi goes to a high level, TFTs 116 in the $i^{th}$ row and the $j^{th}$ column and in the $i^{th}$ row and the $(j+1)^{th}$ column are turned on as shown in FIG. 7A. Therefore, for the pixel in the $i^{th}$ row and the $j^{th}$ column, a data signal Xj is applied to a first end of the pixel capacitor 120 (the pixel electrode 118) and to a first end of the storage capacitor 130, and for the pixel in the $i^{th}$ row and the $(j+1)^{th}$ column, a data signal X(j+1) is applied to a first end of the pixel capacitor 120 and to a first end of the storage capacitor 130.

When the scanning signal Yi is at a high level, the TFTs 51 and 52 corresponding to the $i^{th}$ row are turned on in the capacitor-line driving circuit 150. Therefore, both the voltage Ca-i of the first capacitor line 131 and the voltage Cb-i of the second capacitor line 132 shifts to voltage Lccom, as described above.

The pixel in the $i^{th}$ row and the $j^{th}$ column in frame n does not change in the written positive voltage. Therefore, the pixel in the odd $i^{th}$ row and the even $(j+1)^{th}$ column will be described. The pixel capacitor 120 and the storage capacitor 130 in the $i^{th}$ row and the even $(j+1)^{th}$ column are charged with a voltage (Vb−Lccom), where Vb is the voltage of the data signal X(j+1).

When the scanning signal Yi goes to a low level, the TFTs 116 in the $i^{th}$ row and the $j^{th}$ column and in the $i^{th}$ row and the $(j+1)^{th}$ column are turned off, as shown in FIG. 7B. When the scanning signal Yi goes to a low level, the following scanning signal Y(i+1) goes to a high level (the $(i+1)^{th}$ row is not shown in FIG. 7B). Therefore, the TFTs 53 and 54 corresponding to the $i^{th}$ row are turned on in the capacitor-line driving circuit 150. Thus, the voltage Ca-i of the first capacitor line 131 of the $i^{th}$ row to which the second end of the storage capacitor 130 in the odd $j^{th}$ column is connected shifts to the voltage LCcom of the second capacitance signal Vc2*a* applied to the second feed line 182, which is not changed from that when the scanning signal Yi was at a high level. In contrast, the voltage Cb-i of the second capacitor line 132 of the $i^{th}$ row to which the second end of the storage capacitor 130 is connected shifts to the voltage Vs1 of the third capacitance signal Vc2*b* applied to the third feed line 183, which drops by ΔV from that when the scanning signal Yi was at a high level.

Since the common electrode 108 is constant at voltage LCcom, the electric charge stored in the pixel capacitor 120 in the $i^{th}$ row and the $(j+1)^{th}$ column moves to the storage capacitor 130, decreasing the voltage of the pixel electrode 118.

Specifically, since the voltage of the second end of the storage capacitor 130 drops by ΔV with the voltage of the second end (common electrode) of the pixel capacitor 120 held constant, with the pixel capacitor 120 and the storage capacitor 130 connected in series, the pixel electrode 118 also drops in voltage.

Therefore, the voltage of the pixel electrode 118 which is the point of series connection is expressed by $$Vb-\{Cs/(Cs+Cpix)\}\cdot\Delta V,$$

which is decreased from the voltage Vb of the data signal when the scanning signal Yi was at a high level by the value obtained by multiplying the voltage change ΔV of the second capacitor line 132 of the $i^{th}$ row by the capacitance ratio of the pixel capacitor 120 to the storage capacitor 130 $\{Cs/(Cs+Cpix)\}$.

In other words, when the voltage Cb-i of the second capacitor line 132 of the $i^{th}$ row drops by ΔV, the voltage of the pixel electrode 118 drops from the voltage Vb of the data signal when the scanning signal Yi was at a high level by $\{Cs/(Cs+Cpix)\}\cdot\Delta V$ (=ΔVpix). Here, the parasitic capacitances of the components are ignored.

In frame n, the data signal X(j+1) when the scanning signal Yi is at a high level is set to voltage Vb in anticipation of the voltage drop ΔVpix of the pixel electrode 118. That is, the data signal X(j+1) is set so that the voltage of the pixel electrode 118 after the drop becomes lower than the voltage LCcom of the common electrode 108 and that the difference voltage therebetween corresponds to the gray level of the $i^{th}$ row and $(j+1)^{th}$ column.

Specifically, as shown in FIGS. 8A and 8B, the embodiment is set in such a manner that, in frame n, first, the data signal Xj of a voltage in the range a from voltage Vw(+) corresponding to white w to voltage Vb(+) corresponding to black b and increasing in voltage with respect to LCcom as the gray level decreases (becomes dark) is applied to the pixels in the odd $j^{th}$ column to which positive writing is designated; and the data signal X(j+1) is applied to the pixels in the even $(j+1)^{th}$ columns to which negative writing is designated such that voltage Vb(+) is set for white w and voltage Vw(+) is set for black b, which is in the same range a as that for the positive writing and reversed in gray level; secondly, when the voltage of the data signal X(j+1) is written and the pixel electrode 118 drops by voltage ΔVpix, the voltage ΔV (=LCcom−Vs1) is set so that the voltage of the pixel electrode 118 comes within the range from voltage Vw(−) corresponding to the negative white to voltage Vb(−) corresponding to black and is symmetrical to the positive voltage about voltage LCcom.

Thus, in frame n, in the pixels of the odd-numbered columns to which negative writing is designated, the voltage of the pixel electrode 118 which has dropped by ΔVpix shifts to a voltage in the negative voltage range c corresponding to the gray level and decreases with respect to voltage LCcom as the gray level decreases (becomes dark).

While FIGS. 7A and 7B illustrate negative writing by changing the voltage of the pixel capacitor 120 of an odd-numbered row and an even-numbered column in frame n, negative writing for the even-numbered rows is executed by changing the voltage of the pixel capacitors 120 in the odd-numbered columns. In contrast, for the odd-numbered rows and the odd-numbered columns in frame n, the voltage of the first capacitor line 131 does not change after a positive voltage is written, and for the even-numbered rows and the even-numbered columns, the voltage of the second capacitor line 132 does not change after a positive voltage is written. Accordingly, the positive writing is executed such that the written voltage is held.

For the following frame (n+1), negative writing is executed when the voltage of the pixel capacitors 120 in the odd-numbered row and the odd-numbered column and in the even-numbered row and the even-numbered column changes. For the odd-numbered rows and the even-numbered columns in frame (n+1), the voltage of the second capacitor line 132 does not change after a positive voltage is written, and for the even-numbered rows and the odd-numbered columns, the voltage of the first capacitor line 131 does not change after a positive voltage is written, and thus, the positive writing is executed such that the written voltage is held.

Figure 5:
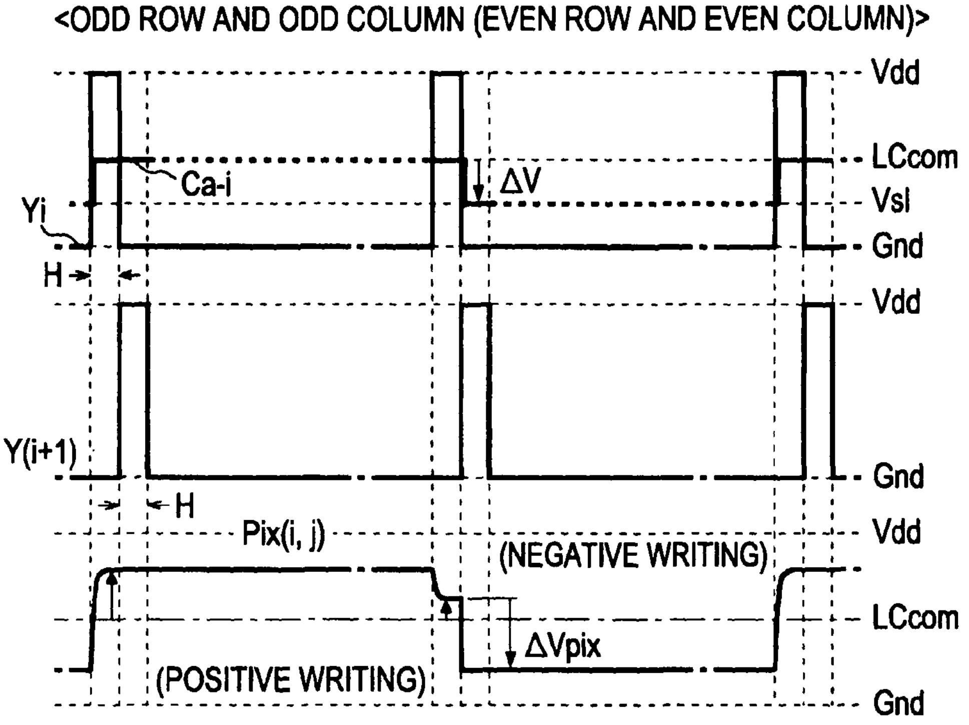
FIG. 5 is a voltage waveform chart for illustrating the operation of the electrooptic device.

FIG. 5 shows the change of the voltage ΔVpix(i, j) of the pixel electrode 118 in the $i^{th}$ row and the $j^{th}$ column in relation to the scanning signals Yi and Y(i+1) and the voltage Ca-i of the first capacitor line 131 of the $i^{th}$ row, representing the pixels in the odd-numbered rows and the odd-numbered columns. As shown in the drawing, for the pixels in the odd-numbered rows and the odd-numbered columns, positive writing without the voltage change of the first capacitor line 131 and negative writing with a decrease ΔV in the voltage of the first capacitor line 131 are executed every one frame. This also applies to the pixels in the even-numbered rows and the even-numbered columns.

Figure 6:
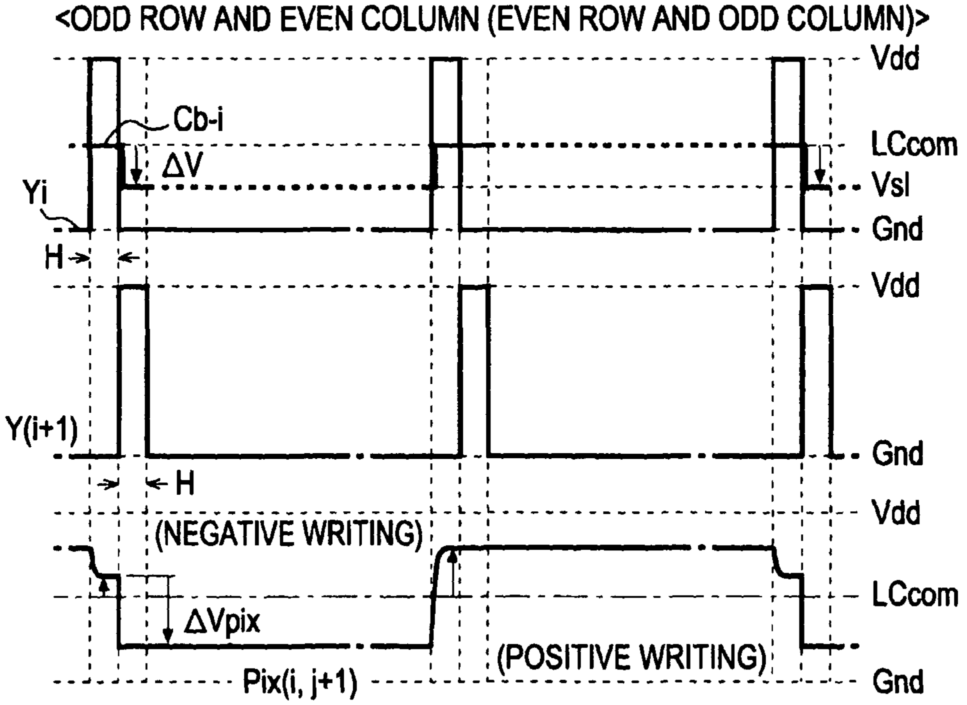
FIG. 6 is a voltage waveform chart for illustrating the operation of the electrooptic device.

FIG. 6 shows the change of the voltage ΔVpix(i, j+1) of the pixel electrode 118 in the $i^{th}$ row and the $(j+1)^{th}$ column in relation to the scanning signals Yi and Y(i+1) and the voltage Cb-i of the second capacitor line 132 of the $i^{th}$ row, representing the pixels in the odd-numbered rows and the even-numbered columns. As shown in the drawing, for the pixels in the odd-numbered rows and the even-numbered columns, negative writing accompanying a decrease ΔV in the voltage of the second capacitor line 132 and positive writing without the voltage change of the second capacitor line 132 are executed every one frame. This also applies to the pixels in the even-numbered rows and the odd-numbered columns.

Referring to FIG. 5, the part of the voltage Ca-i shown by the broken lines indicates that the first capacitor line 131 of the $i^{th}$ row is in high impedance. Referring to FIG. 6, the part of the voltage Cb-i shown by the broken lines indicates that the second capacitor line 132 of the $i^{th}$ row is in high impedance.

Thus, this embodiment adopts dot reversing in which the written polarity of pixels is reversed alternately every row and column, thus allowing high contrast ratio and high definition display with reduced flicker.

In this embodiment, the voltage range a of data signals to pixels to which negative writing is designated is the same as that of data signals to pixels to which positive writing is designated. However, the voltage of the pixel electrode 118 after the change shifts to the range c of a negative voltage corresponding to the gray level. Thus, this embodiment allows the components of the data-line driving circuit 190 not to have high resistance to voltage and decreases the voltage amplitude of the data lines 114 having parasitic capacitance, thus eliminating the waste of power by the parasitic capacitance.

Specifically, when the pixel capacitor 120 is driven by alternating current in a structure in which the common electrode 108 is held at voltage LCcom and one capacitor line is provided for each row, whose voltage is set constant over all the frames, and if a voltage ranging from positive voltage Vw(+) to Vb(+) is written to the pixel electrode 118 in accordance with the gray level in one frame, a voltage ranging from voltage Vw(−) to Vb(−) corresponding to the negative polarity and reversed with reference to voltage LCcom must be written in the next frame, if the gray level does not change. Therefore, with the common electrode 108 held constant in voltage and the capacitor line is held constant in voltage, the resistance to voltage of the components of the data-line driving circuit 190 must be provided for the range b because the voltage of the data signal ranges over the range b. Furthermore, when the voltage of the data lines 114 having parasitic capacitance changes in voltage in the range b, its power is wasted by the parasitic capacitance. This embodiment can eliminate such disadvantages.

In this embodiment, the second capacitance signal Vc2*a* and the third capacitance signal Vc2*b* are switched between the voltages LCcom and Vs1 every horizontal scanning period H, which are exclusive (complementary) to each other. Thus, the power wasted by the parasitic capacitance of the second feed line 182 and the third feed line 183 can be reduced.

Figure 9:
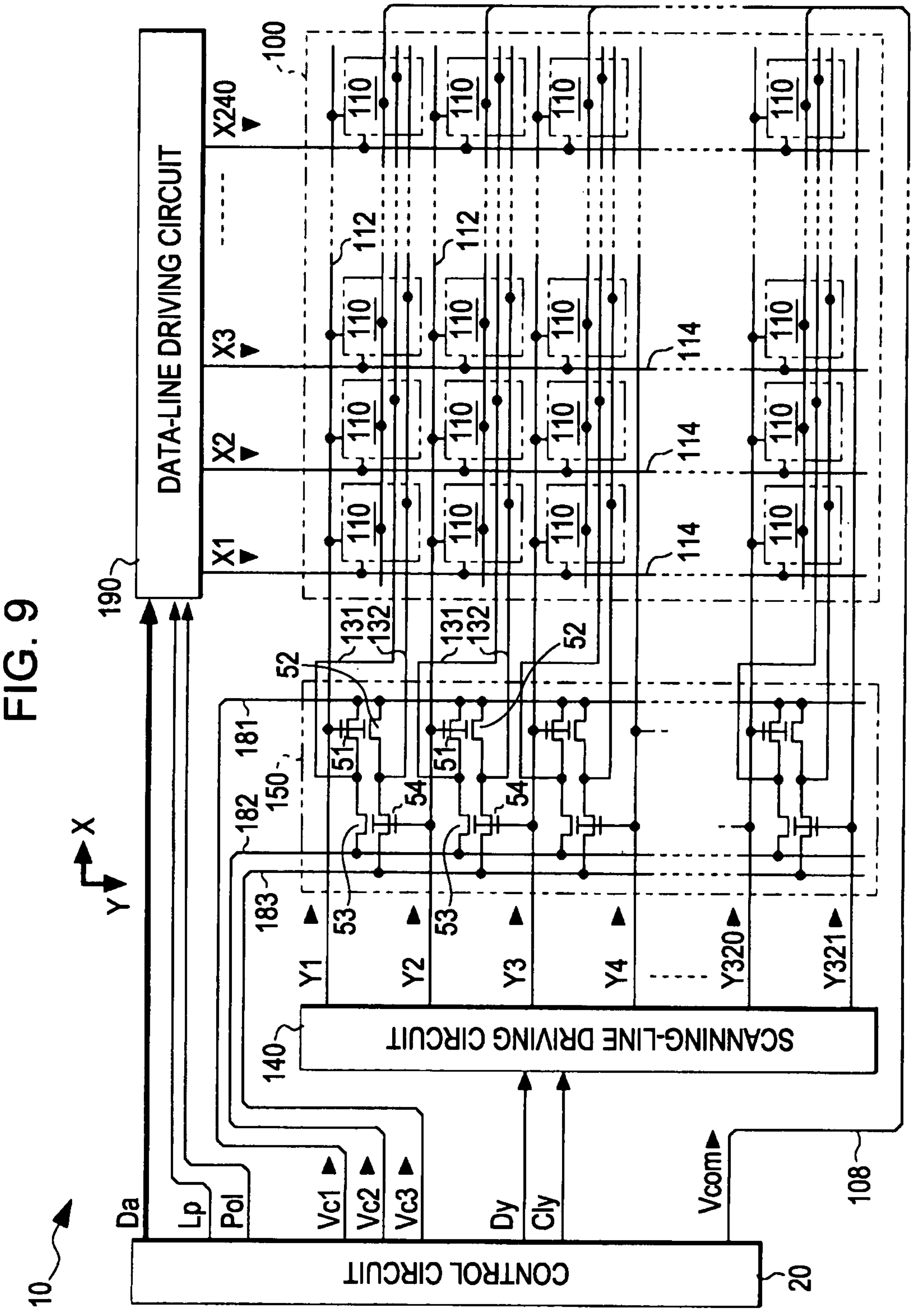
FIG. 9 is a diagram showing a modification of the electrooptic device.
Figure 10:
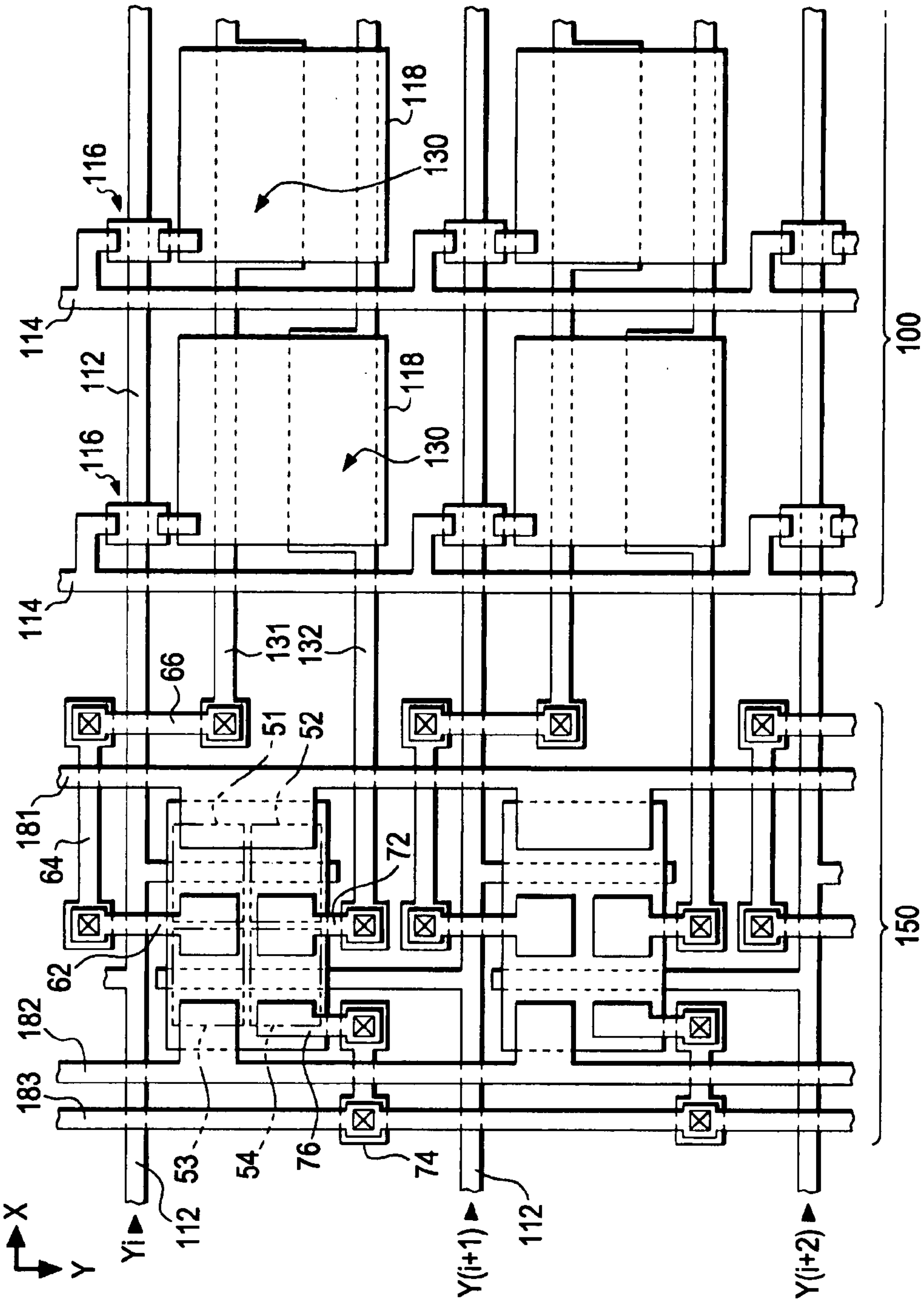
FIG. 10 is a diagram showing the configuration of the boundary between the display region and the capacitor-line driving circuit of the modification.

This embodiment has a structure in which, in each row, the second ends of the storage capacitors 130 in the odd-numbered columns are connected to the first capacitor line 131 and the second ends of the storage capacitors 130 in the even-numbered columns are connected to the second capacitor line 132. Instead, as shown by the black dots in each pixel 110 in FIG. 9, in each row, the second ends of the storage capacitors 130 in the odd-numbered columns may be connected to the second capacitor line 132 and the second ends of the storage capacitors 130 in the even-numbered columns may be connected to the first capacitor line 131. FIG. 10 is a plan view of the boundary between the capacitor-line driving circuit 150 and the display region 100 of the device substrate with such an opposite configuration.

Furthermore, this embodiment uses voltage LCcom and voltage Vsl lower than the voltage LCcom by ΔV as the voltages of the second capacitance signal Vc2*a* and the third capacitance signal Vc2*b*. In place of voltage Vsl, a voltage higher than the voltage LCcom by ΔV may be used.

Referring back to FIG. 4, in the period from the completion of the selection of the $321^{st}$ scanning line 112 to the start of the selection of the first scanning line 112, the second capacitance signal Vc2*a* of the second feed line 182 and the third capacitance signal Vc2*b* of the third feed line 183 may be held constant in voltage.

Second Embodiment

Figure 11:
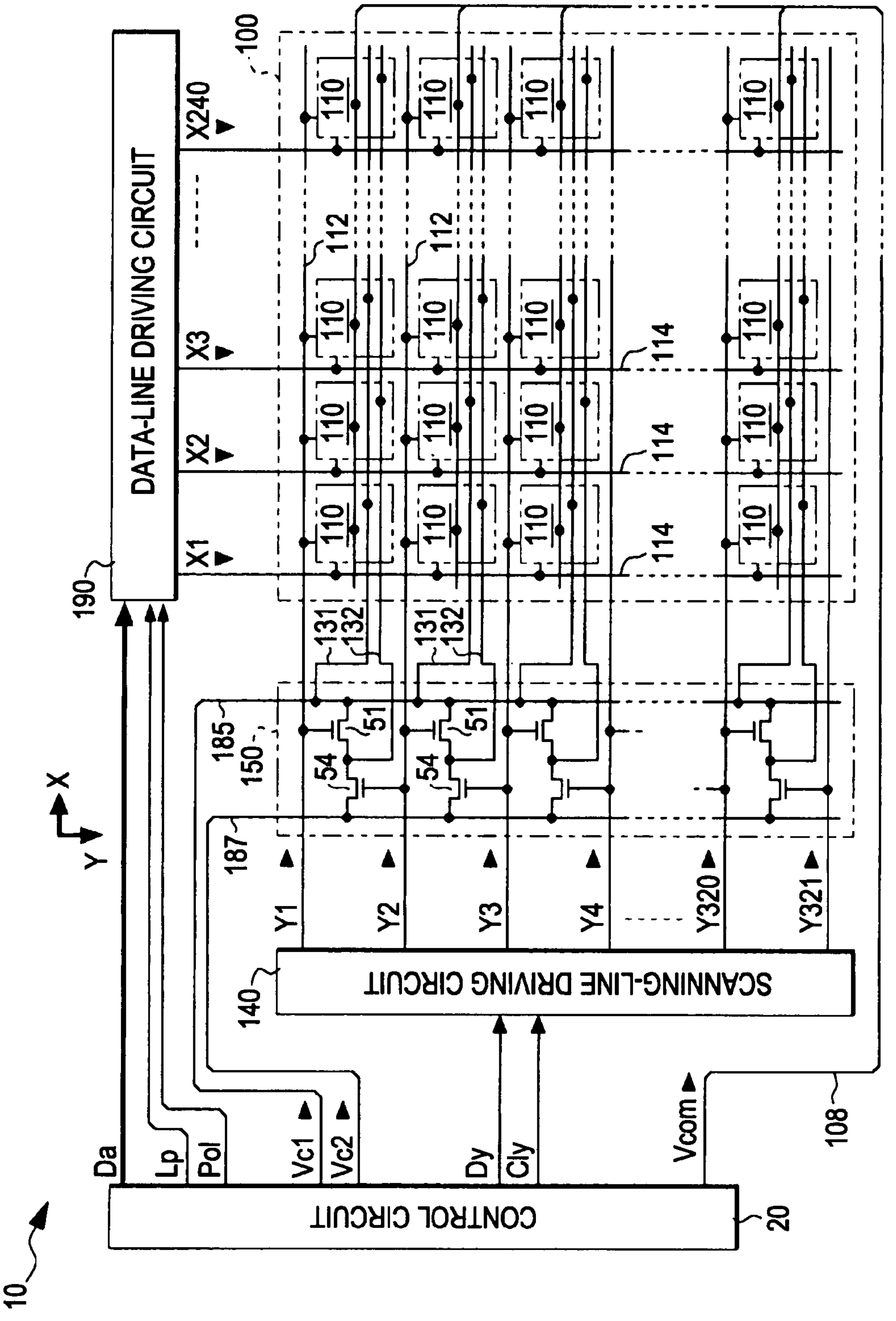
FIG. 11 is a block diagram showing the configuration of an electrooptic device according to a second embodiment of the invention.
Figure 12:
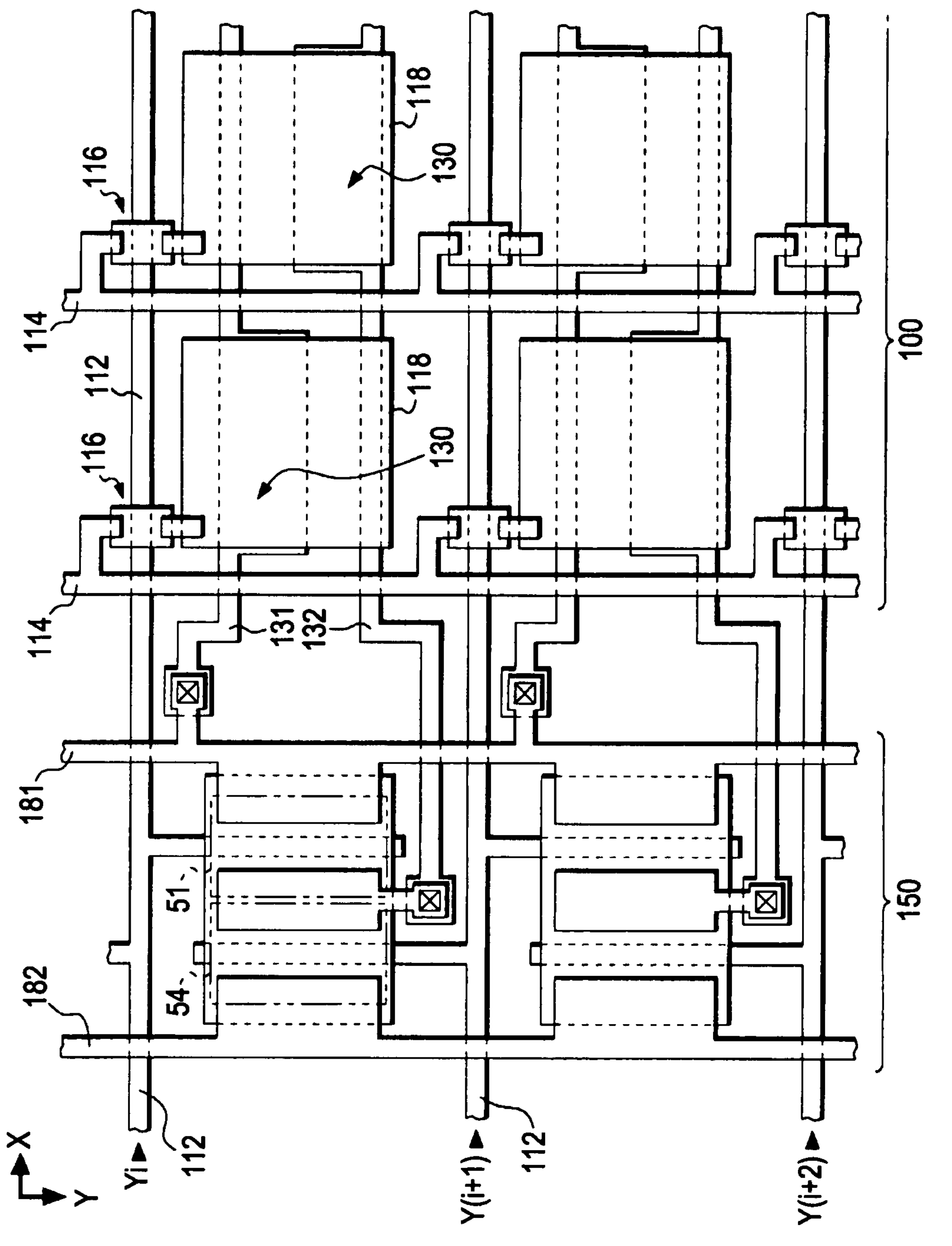
FIG. 12 is a diagram showing the configuration of the boundary between the display region and the capacitor-line driving circuit of the electrooptic device.

A second embodiment of the invention will be described. FIG. 11 is a block diagram of an electrooptic device according to the second embodiment; and FIG. 12 is a plan view of the boundary between the capacitor-line driving circuit 150 and the display region 100 of the device substrate.

The second embodiment is different from the first embodiment shown in FIG. 1 (FIG. 3) in the following points: the configuration of the capacitor-line driving circuit 150 (a first difference); there is no third feed line (a second difference); the relationship between the line to which the second end of the storage capacitor 130 is connected and the capacitor line (a third difference); and the common signal Vcom applied to the common electrode 108 is not constant in voltage (a fourth difference).

The second embodiment will be described centering on these differences.

The first and second differences will first be described. The capacitor-line driving circuit 150 of the second embodiment has only a set of TFTs 51 and 54 for each row. The gate electrode of the TFT 51 corresponding to the $i^{th}$ row is connected to the $i^{th}$ scanning line 112, and the source electrode is connected to a first feed line 185. The gate electrode of the TFT 54 corresponding to the $i^{th}$ row is connected to the $(i+1)^{th}$ scanning line 112, and the source electrode is connected to a second feed line 187. The common drain electrode of the TFTs 51 and 54 corresponding to the $i^{th}$ row is connected to the second capacitor line 132 of the $i^{th}$ row. The first capacitor line 131 of the $i^{th}$ row is connected to the first feed line 185 without passing through the TFTs.

The third difference will next be described. In the second embodiment, as indicated by the dots in the pixels 110 in FIG. 11, the second ends of the storage capacitors 130 in the odd-numbered rows and the odd-numbered columns and in the even-numbered rows and the even-numbered columns are connected to the respective first capacitor lines 131, and the second ends of the storage capacitors 130 in the odd-numbered rows and the even-numbered columns and in the even-numbered rows and the odd-numbered columns are connected to the respective second capacitor lines 132.

Figure 13:
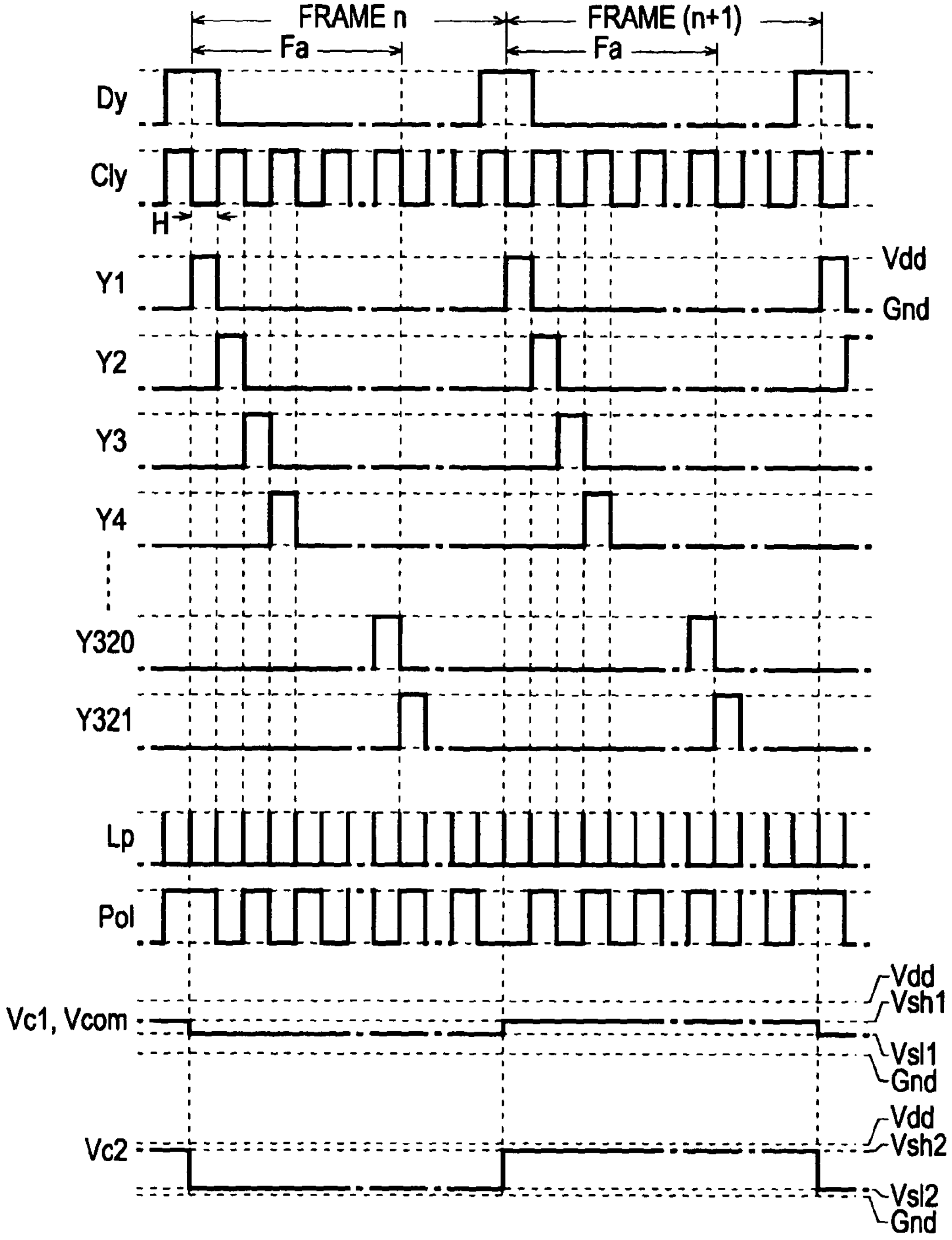
FIG. 13 is a diagram for illustrating the operation of the electrooptic device.

The fourth difference will then be described. As shown in FIG. 13, the common signal Vcom is held at a voltage Vsl1 over frame n, and at a voltage Vsh1 over the next frame (n+1). The control circuit 20 of the second embodiment applies a first capacitance signal Vc1 to the first feed line 185, and a second capacitance signal Vc2 to the second feed line 187, respectively. As shown in FIG. 13, the first capacitance signal Vc1 agrees with the common signal Vcom, and the second capacitance signal Vc2 is held at a voltage Vsl2 over frame n, and held at a voltage Vsh2 over the next frame (n+1). The voltages Vsl1, Vsl2, Vsh1, and Vsh2 have the relation of Vsh2−Vsh1=Vsl1—Vsl2=ΔV.

The operation of the electrooptic device according to the second embodiment will next be described.

Since the first capacitor lines 131 are connected to the first feed line 185, the first capacitor lines 131 come to have the same voltage as the first capacitance signal Vc1. Therefore, the voltage Ca-i of the first capacitor line 131 of the $i^{th}$ row shifts to voltage Vsl1 in frame n, and shifts to voltage Vsh1 in the next frame (n+1) (see FIGS. 13 and 14).

On the other hand, the second capacitor lines 132 are each connected to the first feed line 185 when the TFT 51 is turned on as the scanning signal to the line corresponding thereto goes to a high level, and when the scanning signal for the line next to the corresponding line goes to a high level, the second capacitor lines 132 are each connected to the second feed line 187 as the TFT 54 is turned on. Thus, in frame n, the voltage Cb-i of the second capacitor line 132 in the $i^{th}$ row shifts to voltage Vsl1 in the period during which the scanning signal Yi goes to a high level, and shifts to voltage Vsl2 in the period during which the scanning signal Y(i+1) goes to a high level, decreasing by voltage ΔV, and when the scanning signal Y(i+1) goes to a low level, the voltage Cb-i goes into high impedance. In the next frame (n+1), the voltage Cb-i shifts to voltage Vsh1 in the period during which the scanning signal Yi goes to a high level, and shifts to voltage Vsh2 in the period during which the scanning signal Y(i+1) goes to a high level, increasing by voltage ΔV, and when the scanning signal Y(i+1) goes to a low level, the voltage Cb-i goes into high impedance (see FIGS. 13 and 15).

In this embodiment, the pixels in which the second ends of the storage capacitors 130 are connected to the first feed line 185 via the first capacitor lines 131 are of the odd-numbered rows and the odd-numbered columns and of the even-numbered rows and the even-numbered columns. These pixels do not change in voltage after the voltages of the data signals are written. Therefore, for the pixels in the odd-numbered rows and the odd-numbered columns and in the even-numbered rows and the even-numbered columns in frame n, data signals with a voltage higher than the voltage Vsl1 of the common signal Vcom by the voltage corresponding to the gray level is written; and for frame (n+1), data signals with a voltage lower than the voltage Vsl1 of the common signal Vcom by the voltage corresponding to the gray level is written.

On the other hand, the pixels in which the second ends of the storage capacitors 130 are connected to the second capacitor lines 132 are of the odd-numbered rows and the even-numbered columns and of the even-numbered rows and the odd-numbered columns. These pixels change in the voltage of the second capacitor lines 132 by ΔV after the voltages of the data signals are written. Therefore, for the pixels in the odd-numbered row and the even-numbered columns and in the even-numbered rows and the odd-numbered columns in frame n, when scanning lines corresponding thereto are selected, data signals of a voltage that is set in anticipation of a voltage drop ΔVpix of the pixel electrodes due to the voltage drop ΔV of the second capacitor lines 132 (i.e., a voltage decreased by ΔVpix becomes lower than the voltage Vsl1 of the common signal Vcom by a voltage corresponding to the gray level) are written; and for frame (n+1), when scanning lines corresponding thereto are selected, data signals of a voltage that is set in anticipation of an increase ΔVpix of the voltage of the pixel electrodes due to the increase ΔV of the voltage of the second capacitor lines 132 (i.e., a voltage increased by ΔVpix becomes higher than the voltage Vsl1 of the common signal Vcom by a voltage corresponding to the gray level) are written.

In the second embodiment, the line to which the second ends of the storage capacitors 130 to be connected may be changed; the second ends of the storage capacitors 130 in the odd-numbered rows and the odd-numbered columns and in the even-numbered rows and the even-numbered columns may be connected to the second capacitor lines 132, and the second ends of the storage capacitors 130 in the odd-numbered rows and the even-numbered columns and in the even-numbered rows and the odd-numbered columns may be connected to the first capacitor lines 131.

In the second embodiment, the voltage of the common signal Vcom applied to the common electrode 108 changes at the first (last) of the period of one frame. Thus, for the pixels in the odd-numbered rows and the odd-numbered columns and in the even-numbered rows and the even-numbered columns, when the common electrode 108 changes in voltage, the first capacitor lines 131 also change by the same amount in the same direction at the same time, and for the pixels in the odd-numbered rows and the even-numbered columns and in the even-numbered rows and the odd-numbered columns, when the common electrode 108 changes in voltage, the second capacitor lines 132 are in high impedance.

Figure 14:
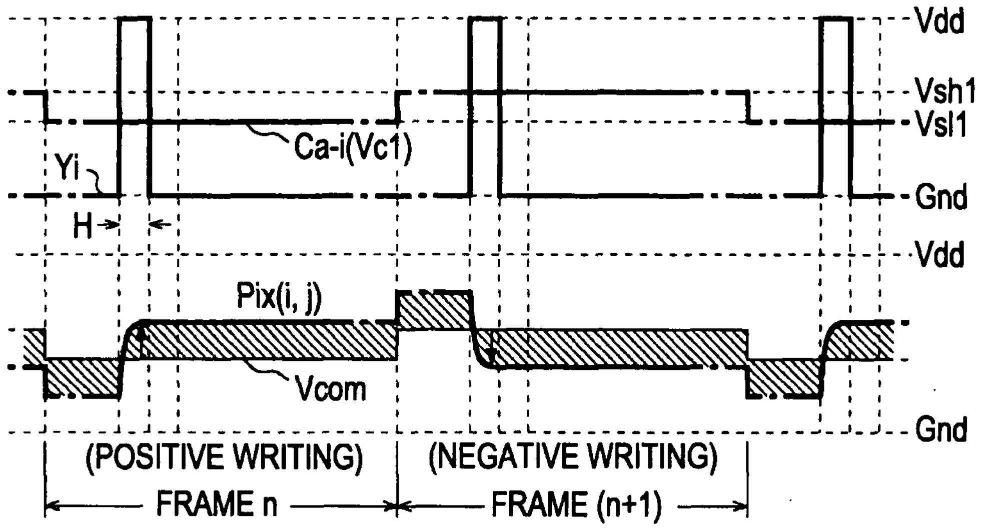
FIG. 14 is a voltage waveform chart for illustrating the operation of the electrooptic device.
Figure 15:
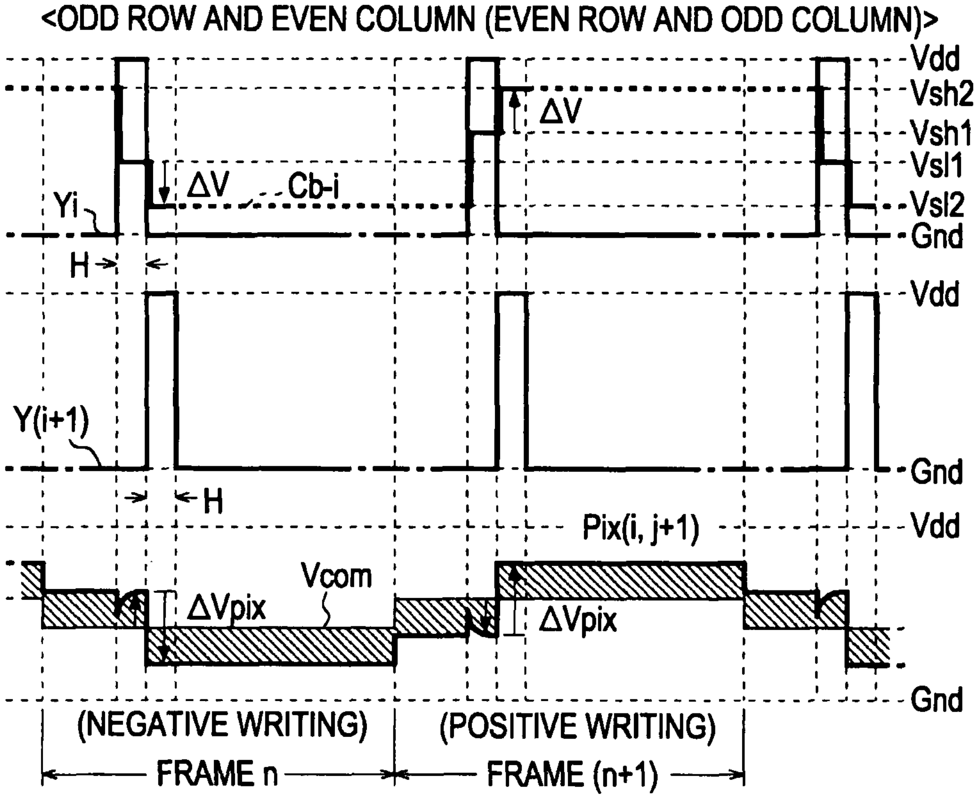
FIG. 15 is a voltage waveform chart for illustrating the operation of the electrooptic device.

Accordingly, in the second embodiment, when the common electrode 108 changes in voltage, the voltage Pix(i, j) of the pixel electrode in the odd $i^{th}$ row and the odd $j^{th}$ column changes by the same amount in the same direction at the same time, as shown in FIG. 14; and the voltage Pix(i, j+1) of the pixel electrode in the odd $i^{th}$ row and the even $(j+1)^{th}$ column changes by the same amount in the same direction at the same time, as shown in FIG. 15. Therefore, the effective voltages (hatched portions) held in the pixel capacitors 120 are not influenced.

Thus, the second embodiment adopts dot reversing in which the written polarity is reversed every row and column, as in the first embodiment. Thus, the embodiment allows high contrast ratio and high definition display with reduced flicker.

The capacitor-line driving circuit 150 of the second embodiment has not the TFTs 52 and 53 of the first embodiment for each row. This simplifies the configuration and reduces the region of the device substrate which does not contribute to display (i.e., the frame), thus reducing the cost.

In addition, the voltages of the first capacitance signal Vc1 (the common signal Vcom) and the second capacitance signal Vc2 are changed not during the horizontal scanning period H as in the first embodiment but during the period of one frame. Thus, the power consumed by the parasitic capacitor with changes in voltage can be reduced.

In the foregoing embodiments, the negative writing is executed by decreasing the voltage of the capacitor lines by ΔV, and the positive writing is executed by holding the voltage of the capacitor lines. Conversely, the positive writing may be executed by increasing the voltage of the capacitor lines by ΔV, and the negative writing may be executed by holding the voltage of the capacitor lines.

In the first embodiment, the gate electrodes of the TFTs 53 and 54 in the $i^{th}$ row of the capacitor-line driving circuit 150 (in the second embodiment, the gate electrode of the TFT 54) is connected to the next $(i+1)^{th}$ scanning line 112. However, it may be connected to a scanning line 112 apart therefrom by m lines. However, as the number of m increases, the gate electrodes of the TFTs 53 and 54 (54) in the $i^{th}$ row must be connected to a $(i+m)^{th}$ scanning line 112, thus complicating the wiring. Furthermore, this requires m dummy scanning lines 112 to turn on the TFTs 53 and 54 (54) corresponding to the capacitor lines of the last $320^{th}$ row.

If m is 1 as in the foregoing embodiments, the flyback time may be eliminated, and the gate electrodes of the TFTs 53 and 54 (54) corresponding to the second capacitor line 132 of the $320^{th}$ row may be connected to the scanning line 112 of the first row. If m is 2, the flyback time may also be eliminated, and the gate electrodes of the TFTs 53 and 54 (54) corresponding to the $319^{th}$ and the $320^{th}$ rows may be connected to the scanning lines 112 of the first and second rows, respectively. This eliminates the need for the dummy scanning line.

In the foregoing embodiments, since the vertical scanning is executed downward, the gate electrodes of the TFTs 53 and 54 (54) of the $i^{th}$ row are connected to the scanning line 112 of the $(i+1)^{th}$ row. For upward vertical scanning, the gate electrodes may be connected to the scanning line 112 of the $(i-1)^{th}$ row. In other words, the gate electrodes of the TFTs 53 and 54 (54) in the $i^{th}$ row may be connected to a scanning line 112 other than the $i^{th}$ scanning line and which is selected in the vertical scanning direction after the $i^{th}$ scanning line is selected.

While the pixel capacitor 120 of the foregoing embodiments has a configuration in which the liquid crystal 105 is sandwiched between the pixel electrode 118 and the common electrode 108, and the electric field applied to the liquid crystal 105 is perpendicular to the substrate surface. Instead, the pixel electrode, the insulating layer, and the common electrode may be disposed in layers and the electric field applied to the liquid crystal may be parallel with the substrate surface.

In the foregoing embodiments, the written polarity is reversed every period of one frame in units of the pixel capacitor 120. This is merely for driving the pixel capacitor 120 with an alternating current. Thus, the polarity may be reversed every two or more frames.

While the pixel capacitor 120 is set in a normally white mode, it may be set in a normally black mode in which pixels become dark under no voltage. Three pixels of red, green, and blue may constitute one dot for color display; four pixels including additional color (e.g., cyan) may constitute one dot to improve the color reproducibility.

In the foregoing description, the polarity writing is based on the voltage of the common electrode 108. This is for the case where the TFTs 116 of the pixels 110 function as ideal switches. However the fact is that the parasitic capacitance between the gate electrode and the drain electrode of the TFT 116 causes a phenomenon (referred to as push-down, punch through, or field through) in which the potential of the drain electrode (the pixel electrode 118) is decreased when the TFT 116 is turned off. The pixel capacitor 120 must be driven by alternating current to prevent degradation of the liquid crystal. However, if the pixel capacitor 120 is driven by alternating current using the voltage applied to the common electrode 108 as the reference of written polarity, the effective voltage of the pixel capacitor 120 by negative writing becomes a little higher than that by positive writing (when the TFT 116 is of an n-channel type. Therefore, in practice, the reference voltage of the polarity writing may be separated from the voltage of the common electrode 108. More specifically, the reference voltage of the polarity writing may be shifted higher than the voltage of the common electrode to offset the influence of the push-down.

Since the storage capacitor 130 is insulated for a direct current, such conditions that the voltage of the first or second capacitor line changes by $\Delta V$ after voltage is written to the pixel capacitor 120 and the storage capacitor 130 may be met.

Electronic Device

Figure 16:
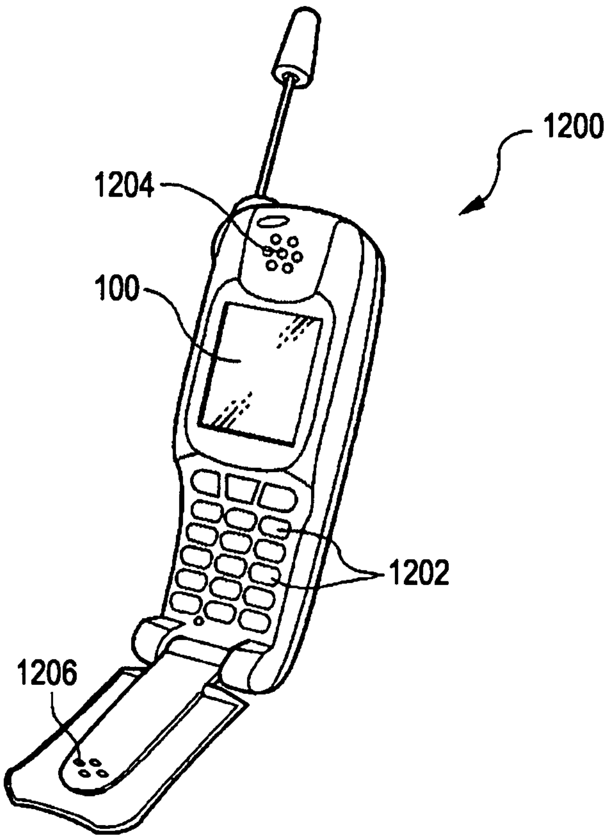
FIG. 16 is a diagram showing the structure of a portable phone incorporating the electrooptic device according to an embodiment.

An electronic device equipped with the electrooptic device 10 according to the embodiments as a display will now be described. FIG. 16 illustrates the structure of a portable phone 1200 that adopts the electrooptic device 10 according to either of the embodiments.

As illustrated, the portable phone 1200 includes a plurality of operation buttons 1202, an ear piece 1204, a mouthpiece 1206, and the electrooptic device 10. The components of the electrooptic device 10 other than that corresponding to the display region 100 do not appear externally.

Examples of electronic devices incorporating the electrooptic device 10 include, in addition to the portable phone shown in FIG. 16, digital still cameras, notebook computers, liquid crystal televisions, viewfinder (or monitor-direct-view type) videotape recorders, car navigation systems, pagers, electronic notebooks, calculators, word processors, workstations, TV phones, POS terminals, and devices having a touch panel. Obviously, the electrooptic device 10 can be used as the displays of the various electronic devices.

The entire disclosure of Japanese Patent Application No. 2006-237366, filed Sep. 1, 2006 is expressly incorporated by reference herein.

What is claimed is:

1. A driving circuit of an electrooptic device, comprising:
- a plurality of scanning lines;
- a plurality of data lines;
- first and second capacitor lines corresponding to each of the plurality of scanning lines, wherein the first capacitor line is separate from the second capacitor line;
- a common electrode;
- rows and columns of pixels corresponding to the intersections of the plurality of scanning lines and the plurality of data lines, the pixels each including:
  - a pixel switching element connected at one end to a data line corresponding to the element itself, and brought into conduction when a scanning line corresponding to the element itself is selected;
  - a pixel capacitor disposed between the pixel switching element and the common electrode; and
  - a storage capacitor disposed between one end of the pixel capacitor and one of the first and second capacitor lines corresponding to the scanning line;
- a scanning-line driving circuit that selects the scanning lines in a predetermined order; and
- a capacitor-line driving circuit that shifts the voltage of a first capacitor line corresponding to one scanning line to a predetermined voltage when the one scanning line is selected, and when a scanning line apart from the one scanning line by predetermined number of lines is selected, changes the predetermined voltage by a predetermined value or holds the predetermined voltage; and when the one scanning line is selected, shifts the voltage of a second capacitor line corresponding to the one scanning line to the predetermined voltage, and when a scanning line apart from the one scanning line by predetermined number of lines is selected, holds the predetermined voltage or changes the predetermined voltage by the predetermined value; and
- a data-line driving circuit that applies a data signal to pixels corresponding to a selected scanning line via a data line, the data signal having a voltage corresponding to the gray level of the pixels, wherein a first end of the storage capacitor is connected to the pixel capacitor, and a second end of the storage capacitor is connected to only one of the first and second capacitor lines, and wherein the first capacitor lines are connected to odd-numbered columns of pixels, and the second capacitor lines are connected to even-numbered columns of pixels;

when the one scanning line is selected, the capacitor-line driving circuit connects the first capacitor line corresponding to the one scanning line to a first feed line that feeds a first capacitance signal of the predetermined voltage, and when a scanning line apart from the one scanning line by predetermined number of lines is selected, the capacitor-line driving circuit connects the first capacitor line to a second feed line that feeds a second capacitance signal of one of voltages higher and lower than the predetermined voltage by a predetermined value or of the predetermined voltage; and when the one scanning line is selected, the capacitor-line driving circuit connects the second capacitor line corresponding to the one scanning line to the first feed line, and when a scanning line apart from the one scanning line by predetermined number of lines is selected, the capacitor-line driving circuit connects the second capacitor line to a third feed line that feeds a third capacitance signal of the predetermined voltage or the other one of voltages higher and lower than the predetermined voltage by the predetermined value;

the capacitor-line driving circuit comprises:

first to fourth transistors corresponding to each row, wherein the gate electrodes of the first and second transistors corresponding to the first and second capacitor lines, respectively, are connected to the scanning line corresponding to the one scanning line, and the source electrodes of the first and second transistors are connected to the first feed line;

the gate electrode of the third transistor is connected to a scanning line apart from the scanning line corresponding to the one capacitor line by predetermined number of lines, and the source electrode of the third transistor is connected to the second feed line;

the gate electrode of the fourth transistor is connected to a scanning line apart from the scanning line corresponding to the one capacitor line by predetermined number of lines, and the source electrode of the fourth transistor is connected to the third feed line; and the drain electrodes of the first and third transistors are connected to the first capacitor line corresponding to the line, and the drain electrodes of the second and fourth transistors are connected to the second capacitor line corresponding to the line.

2. The driving circuit of an electrooptic device according to claim 1, wherein:

in the pixels corresponding to the one scanning line, storage capacitors corresponding to data lines in odd-numbered columns are each disposed between one end of a pixel capacitor corresponding to the pixel itself and one of the first and second capacitor lines; and storage capacitors corresponding to data lines in even-numbered columns are each disposed between one end of a pixel capacitor corresponding to the pixel itself and the other one of the first and second capacitor lines.

3. The driving circuit of an electrooptic device according to claim 1, wherein the first capacitance signal is temporally constant at the predetermined voltage; and the voltages of the second and third capacitance signals are higher or lower exclusively from each other, and are switched every time one scanning line is selected.

4. The driving circuit of an electrooptic device according to claim 1, wherein the capacitor-line driving circuit brings the first and second capacitor lines corresponding to one scanning line into high impedance after the selection of a scanning line apart from the one scanning line by predetermined number of lines and following the one scanning line is completed until the one scanning line is selected again.

5. A driving circuit of an electrooptic device, comprising:

a plurality of scanning lines;

a plurality of data lines;

first and second capacitor lines corresponding to each of the plurality of scanning lines, wherein the first capacitor line is separate from the second capacitor line;

a common electrode;

pixels corresponding to the intersections of the plurality of scanning lines and the plurality of data lines, the pixels each including:

a pixel switching element connected at one end to a data line corresponding to the element itself, and brought into conduction when a scanning line corresponding to the element itself is selected, a pixel capacitor disposed between the pixel switching element and the common electrode, and a storage capacitor disposed between one end of the pixel capacitor and one of the first and second capacitor lines corresponding to the scanning line;

a scanning-line driving circuit that selects the scanning lines in a predetermined order; and a capacitor-line driving circuit that shifts the voltage of a first capacitor line corresponding to one scanning line to a predetermined voltage when the one scanning line is selected, and when a scanning line apart from the one scanning line by predetermined number of lines is selected, changes the predetermined voltage by a predetermined value or holds the predetermined voltage; and when the one scanning line is selected, shifts the voltage of a second capacitor line corresponding to the one scanning line to the predetermined voltage, and when a scanning line apart from the one scanning line by predetermined number of lines is selected, holds the predetermined voltage or changes the predetermined voltage by the predetermined value; and a data-line driving circuit that applies a data signal to pixels corresponding to a selected scanning line via a data line, the data signal having a voltage corresponding to the gray level of the pixels, wherein the capacitor-line driving circuit comprises:

first to fourth transistors corresponding to each row, wherein the gate electrodes of the first and second transistors corresponding to the first and second capacitor lines, respectively, are connected to the scanning line corresponding to the one scanning line, and the source electrodes of the first and second transistors are connected to the first feed line;

the gate electrode of the third transistor is connected to a scanning line apart from the scanning line corresponding to the one capacitor line by predetermined number of lines, and the source electrode of the third transistor is connected to the second feed line;

the gate electrode of the fourth transistor is connected to a scanning line apart from the scanning line corresponding to the one capacitor line by predetermined number of lines, and the source electrode of the fourth transistor is connected to the third feed line; and the drain electrodes of the first and third transistors are connected to the first capacitor line corresponding to the line, and the drain electrodes of the second and fourth transistors are connected to the second capacitor line corresponding to the line.

6. The driving circuit of an electrooptic device according to claim 5, wherein the capacitor-line driving circuit brings the first and second capacitor lines corresponding to one scanning line into high impedance after the selection of a scanning line apart from the one scanning line by predetermined number of lines and following the one scanning line is completed until the one scanning line is selected again.

7. A driving circuit of an electrooptic device, comprising:

a plurality of scanning lines;

a plurality of data lines;

first and second capacitor lines corresponding to each of the plurality of scanning lines, wherein the first capacitor line is separate from the second capacitor line;

a common electrode;

pixels corresponding to the intersections of the plurality of scanning lines and the plurality of data lines, the pixels each including:

a pixel switching element connected at one end to a data line corresponding to the element itself, and brought into conduction when a scanning line corresponding to the element itself is selected;

a pixel capacitor disposed between the pixel switching element and the common electrode; and a storage capacitor disposed between one end of the pixel capacitor and one of the first and second capacitor lines corresponding to the scanning line;

a scanning-line driving circuit that selects the scanning lines in a predetermined order; and a capacitor-line driving circuit that shifts the voltage of a first capacitor line corresponding to one scanning line to a predetermined voltage when the one scanning line is selected, and when a scanning line apart from the one scanning line by predetermined number of lines is selected, changes the predetermined voltage by a predetermined value or holds the predetermined voltage; and when the one scanning line is selected, shifts the voltage of a second capacitor line corresponding to the one scanning line to the predetermined voltage, and when a scanning line apart from the one scanning line by predetermined number of lines is selected, holds the predetermined voltage or changes the predetermined voltage by the predetermined value; and a data-line driving circuit that applies a data signal to pixels corresponding to a selected scanning line via a data line, the data signal having a voltage corresponding to the gray level of the pixels, wherein a first end of the storage capacitor is connected to the pixel capacitor, and a second end of the storage capacitor is connected to only one of the first and second capacitor lines, wherein when the one scanning line is selected, the capacitor-line driving circuit connects the first capacitor line corresponding to the one scanning line to a first feed line that feeds a first capacitance signal of the predetermined voltage, and when a scanning line apart from the one scanning line by predetermined number of lines is selected, the capacitor-line driving circuit connects the first capacitor line to a second feed line that feeds a second capacitance signal of one of voltages higher and lower than the predetermined voltage by a predetermined value or of the predetermined voltage, wherein when the one scanning line is selected, the capacitor-line driving circuit connects the second capacitor line corresponding to the one scanning line to the first feed line, and when a scanning line apart from the one scanning line by predetermined number of lines is selected, the capacitor-line driving circuit connects the second capacitor line to a third feed line that feeds a third capacitance signal of the predetermined voltage or the other one of voltages higher and lower than the predetermined voltage by the predetermined value, and wherein the capacitor-line driving circuit comprises:

first to fourth transistors corresponding to each row, wherein the gate electrodes of the first and second transistors corresponding to the first and second capacitor lines, respectively, are connected to the scanning line corresponding to the one scanning line, and the source electrodes of the first and second transistors are connected to the first feed line;

the gate electrode of the third transistor is connected to a scanning line apart from the scanning line corresponding to the one capacitor line by predetermined number of lines, and the source electrode of the third transistor is connected to the second feed line;

the gate electrode of the fourth transistor is connected to a scanning line apart from the scanning line corresponding to the one capacitor line by predetermined number of lines, and the source electrode of the fourth transistor is connected to the third feed line; and the drain electrodes of the first and third transistors are connected to the first capacitor line corresponding to the line, and the drain electrodes of the second and fourth transistors are connected to the second capacitor line corresponding to the line.

8. The driving circuit of an electrooptic device according to claim 7, wherein the capacitor-line driving circuit brings the first and second capacitor lines corresponding to one scanning line into high impedance after the selection of a scanning line apart from the one scanning line by predetermined number of lines and following the one scanning line is completed until the one scanning line is selected again.

* * * * *